United States Patent
Zhu

(10) Patent No.: US 10,268,105 B1
(45) Date of Patent: Apr. 23, 2019

(54) SOFT BOX

(71) Applicant: Aidi Zhu, Yuyao (CN)

(72) Inventor: Aidi Zhu, Yuyao (CN)

( * ) Notice: Subject to any disclaimer, the term of this patent is extended or adjusted under 35 U.S.C. 154(b) by 0 days.

(21) Appl. No.: 16/026,033

(22) Filed: Jul. 2, 2018

Related U.S. Application Data

(60) Provisional application No. 62/624,899, filed on Feb. 1, 2018.

(51) Int. Cl.
| | |
|---|---|
| *F21V 7/00* | (2006.01) |
| *F21V 11/18* | (2006.01) |
| *F21V 17/02* | (2006.01) |
| *F21V 17/10* | (2006.01) |
| *G03B 15/06* | (2006.01) |

(52) U.S. Cl.
CPC ............ *G03B 15/06* (2013.01); *F21V 7/0008* (2013.01); *F21V 11/18* (2013.01); *F21V 17/02* (2013.01); *F21V 17/105* (2013.01)

(58) Field of Classification Search
CPC . F21V 7/18; F21V 7/0008; F21V 1/06; F21V 17/02; F21V 17/105; F21V 17/007; G03B 15/06

See application file for complete search history.

(56) References Cited

U.S. PATENT DOCUMENTS

| | | | |
|---|---|---|---|
| 6,733,145 B2 | 5/2004 | Shirilla | |
| 7,978,971 B1 * | 7/2011 | Honl | ...................... G03B 15/02 396/198 |
| 2002/0141172 A1 * | 10/2002 | Shirilla | ..................... F21V 7/18 362/16 |

* cited by examiner

*Primary Examiner* — Mary Ellen Bowman
(74) *Attorney, Agent, or Firm* — Brett A. Schenck

(57) ABSTRACT

A soft box is provided. The soft box includes a collapsible frame that supports a fabric shell, a backplate, a support spindle, support rods extending from the back plate and operatively attached to the support spindle. The soft box may include a deflector plate that is removably attached to the support spindle by magnetic force. The soft box may also include a locking knob pivotally attached to the back plate and configured to removably attach an adapter ring to the back plate and tilt radially outwardly relative to the back plate while remaining attached to the back plate to enable removal of the adapter ring. The soft box may also include a mount that is configured to attach to a light fixture that does not use an adapter ring to attach the light fixture to the soft box.

20 Claims, 26 Drawing Sheets

SOFT BOX

FIELD

This application relates to a soft box.

BACKGROUND

Light modifiers or soft boxes are commonly used in the field of photography as a method to alter or change the shape of light projected from a light source and are commonly referred to as a soft box. Traditional soft boxes and their parts such as one that is illustrated in FIG. 28 have a reflective interior to help maximize light output from the light source and rods that create the form of the soft box. These rods are then placed into an adapter ring to keep the form of the soft box in place. These adapter rings are specific to each brand and type of light source meaning you must buy one adapter ring for each different type of light you own.

In recent years, light modifiers have been designed to include the adapter ring within the design making the light modifier one complete unit. However, the user is subject to only having the ability to use this product with one type of light source meaning the user would have to buy an entire second soft box with built-in adapter ring to work with a different brand or type of light. In addition, there is a second type of mounting bracket used for light sources commonly referred to as speed lights or flashes that differ in format from a traditional adapter ring. Thus, if a user desires to use a soft box with these types of lights, they must purchase an entire new soft box and mounting bracket.

Users of light modifiers like the ability to deflect the light that is projected into a soft box. By deflecting light, the user applies a plate or reflective object directly in front of the light source bouncing the projected light backwards. This projected light is then gathered towards the back of the soft box and projected forward around the deflector plate bouncing off the reflective interior of the soft box. This creates a soft center to the soft box with brighter outer edges providing lighting results commonly referred to as beauty dish lighting and is a desired lighting effect. Currently deflector plates are in the form of a large metal circular apparatus (FIG. 25) designed specifically per light source that cannot be used in tandem with a soft box or flat plates (FIG. 26) that are commonly held onto a light modifier through screws that can be easily misplaced.

The current soft boxes in the market all have the deficiency of not being universal to a variety of light sources, difficult set up of deflector plates or no deflector plate option, hard to assemble, store and transport. A user must either buy a separate adapter ring for each light modifier they wish to use or the user can buy a soft box with built-in adapter ring but will be required to buy an entire new unit if desiring to use this soft box on more than one type of light source. In addition, if the user wishes to create a beauty dish style lighting effect, they must either buy a metal round plate that does not work with their soft box or a separate plate for their soft box that is cumbersome to attach with screws that are easy to lose.

SUMMARY

In one aspect of the present invention, a soft box includes a collapsible frame that supports a fabric shell, a back plate, a support spindle, a plurality of support rods, and a deflector plate. The plurality of support rods are circumferentially spaced about the back plate. The support rods are operatively attached to the support spindle. The deflector plate is removably attached to the support spindle by magnetic force.

In another aspect of the present invention, a soft box includes a collapsible frame that supports a fabric shell, a back plate, a support spindle, a plurality of support rods, and at least one locking knob. The plurality of support rods are circumferentially spaced about the back plate. The support rods are operatively attached to the support spindle. The at least one locking knob is pivotally attached to the back plate. The at least one locking knob is configured to removably attach an adapter ring to the back plate. The at least one locking knob is configured to be in a first position that attaches the adapter ring to the back plate such that rotation of the adapter ring relative to the back plate is prevented. The at least one locking knob tilts radially outwardly relative to the back plate while remaining attached to the back plate in a second position to enable removal of the adapter ring.

In another aspect of the present invention, a soft box includes a collapsible frame that supports a fabric shell, a back plate, a support spindle, a plurality of support rods, and a mount. The plurality of support rods are circumferentially spaced about the back plate. The support rods are operatively attached to the support spindle. The mount is attached to the back plate. The mount is configured to attach to a light fixture that does not use an adapter ring to attach the light fixture to the soft box.

Still other benefits and advantages of the invention will become apparent to those skilled in the art of photography upon reading and understanding of the details of invention.

Other aspects of the disclosed invention will become apparent from the following detailed description, the accompanying drawings and the appended claims.

DETAILED DESCRIPTION

It will be readily understood that the components of the embodiments as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, etc. In other instances, well-known structures, materials, or operations are not shown or described in detail to avoid obfuscation.

The following description is intended only by way of example, and simply illustrates certain example embodiments.

Figure 1:
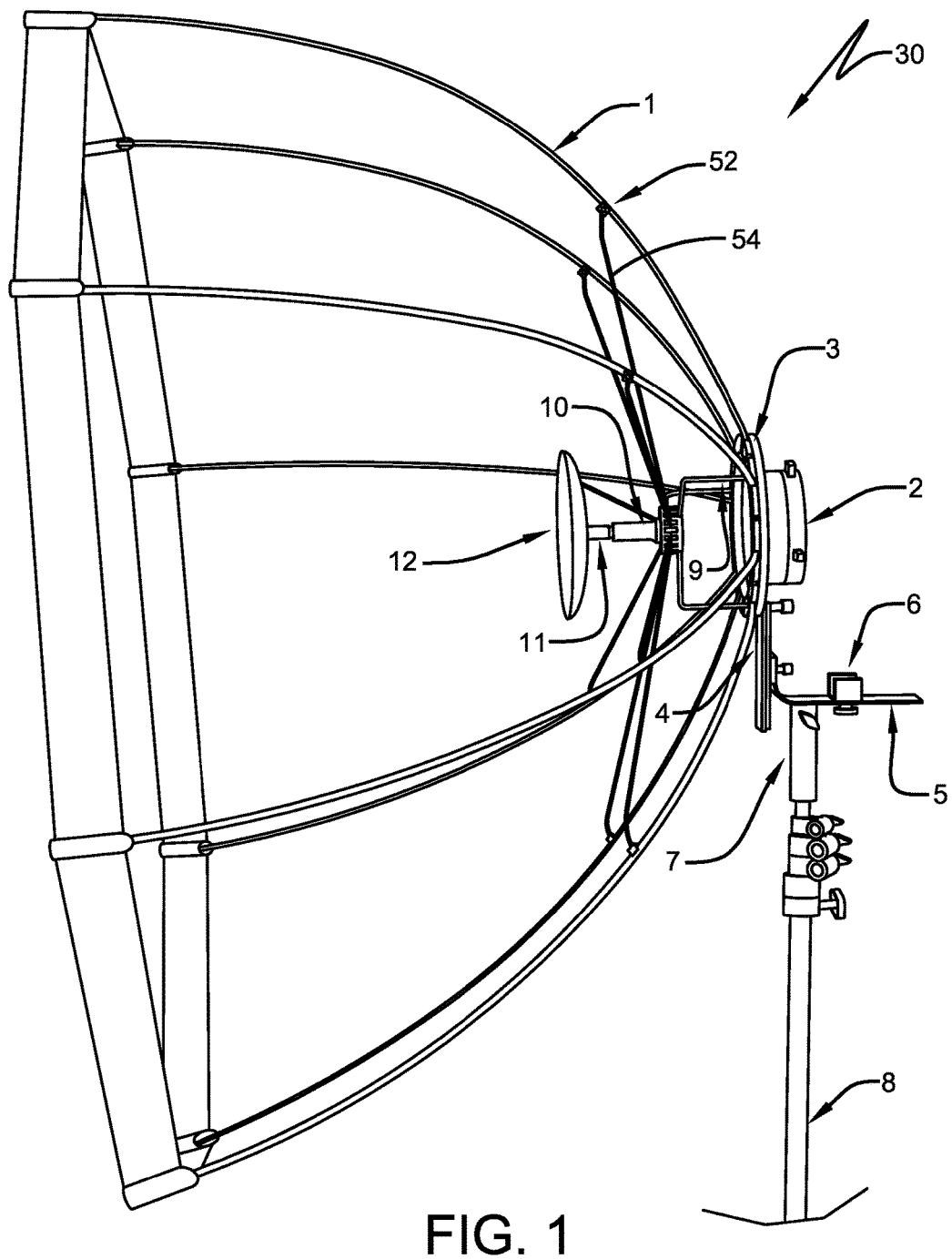
FIG. 1 is a right side view of the soft box without the fabric cover according to an embodiment of the invention.
Figure 1A:
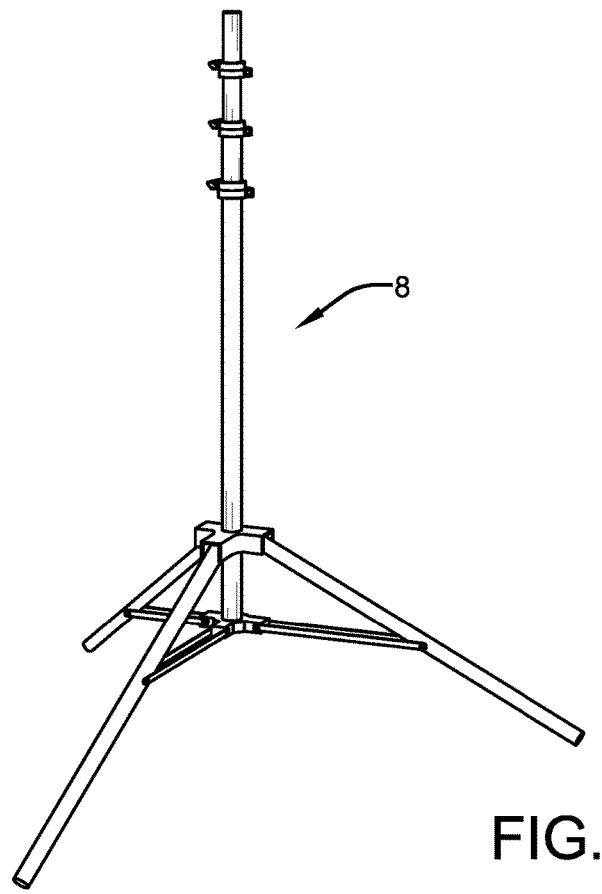
FIG. 1A is a perspective view of the light stand.

Throughout the present description, the terms "upper", "lower", "top", and "bottom" shall define directions or orientations with respect to the soft box as illustrated in FIG. 1. It will be understood that these spatially relative terms are intended to encompass different orientations of the soft box in use or operation in addition to the orientation depicted in the figures. For example, if the soft box in the figures is turned over, elements described as "upper" elements or features would then be "lower" elements or features.

Figure 2:
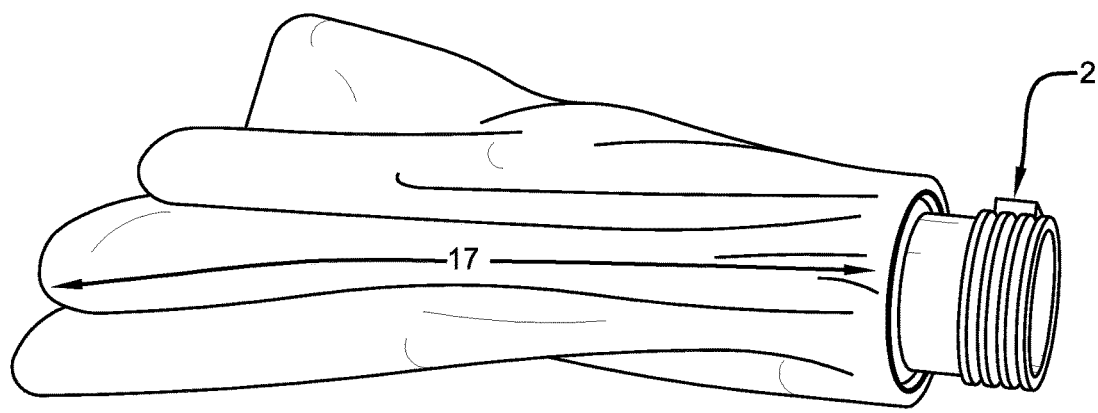
FIG. 2 is a perspective view of a portion of the soft box with the cover but without the light stand and bracket in a collapsed position.
Figure 3:
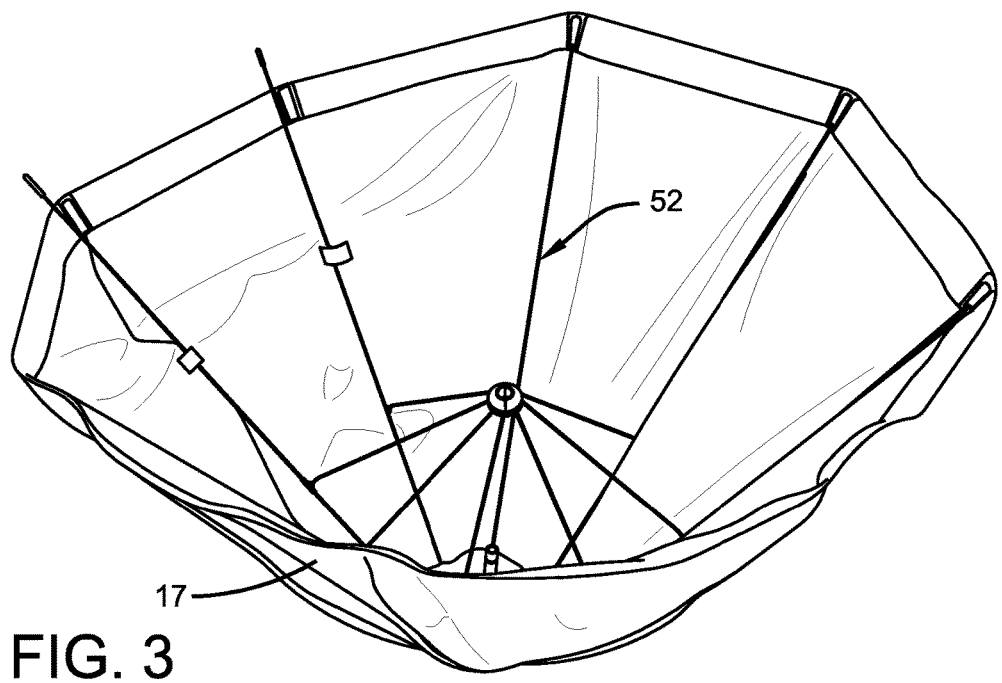
FIG. 3 is a front perspective view of the portion of the soft box of FIG. 2 starting to be opened.
Figure 4:
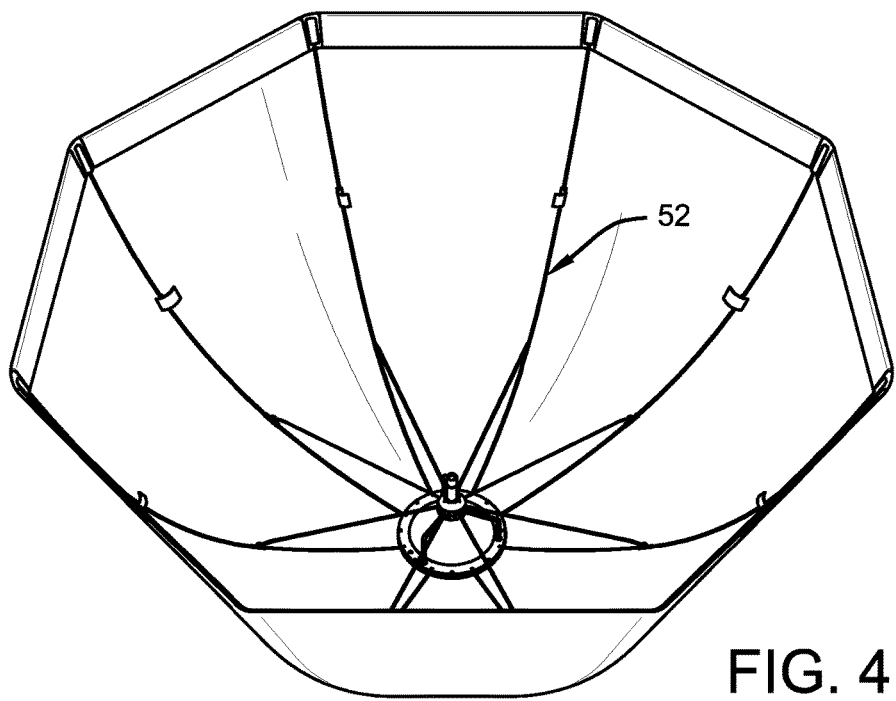
FIG. 4 is a front perspective view of the portion of the soft box of FIG. 2 opened and the frame locked in place.

Referring to FIG. 1, a soft box 30 is shown that includes an umbrella style quick collapse frame 52 incorporating outer ribs 1 that are used to attach the reflective fabric shell 17 (FIG. 2). Stretcher rods 54 are pivotally connected at one end to their respective ribs 1 and pivotally connected to a central runner 56 (FIG. 9) at their other end. Forward movement of the runner 56 out away from of the fabric shell 17 collapses the frame 52 as illustrated in FIGS. 2-4. The ribs 1 are attached to a central interchangeable back plate 3, which houses locking knobs 13 (see FIG. 6) on the outermost side that tilt outwardly exposing a channel 15 (see FIG. 5) for insertion of a variety of adapter rings 2. The channel 15 is formed adjacent the inner edge of the back plate 3

Figure 5:
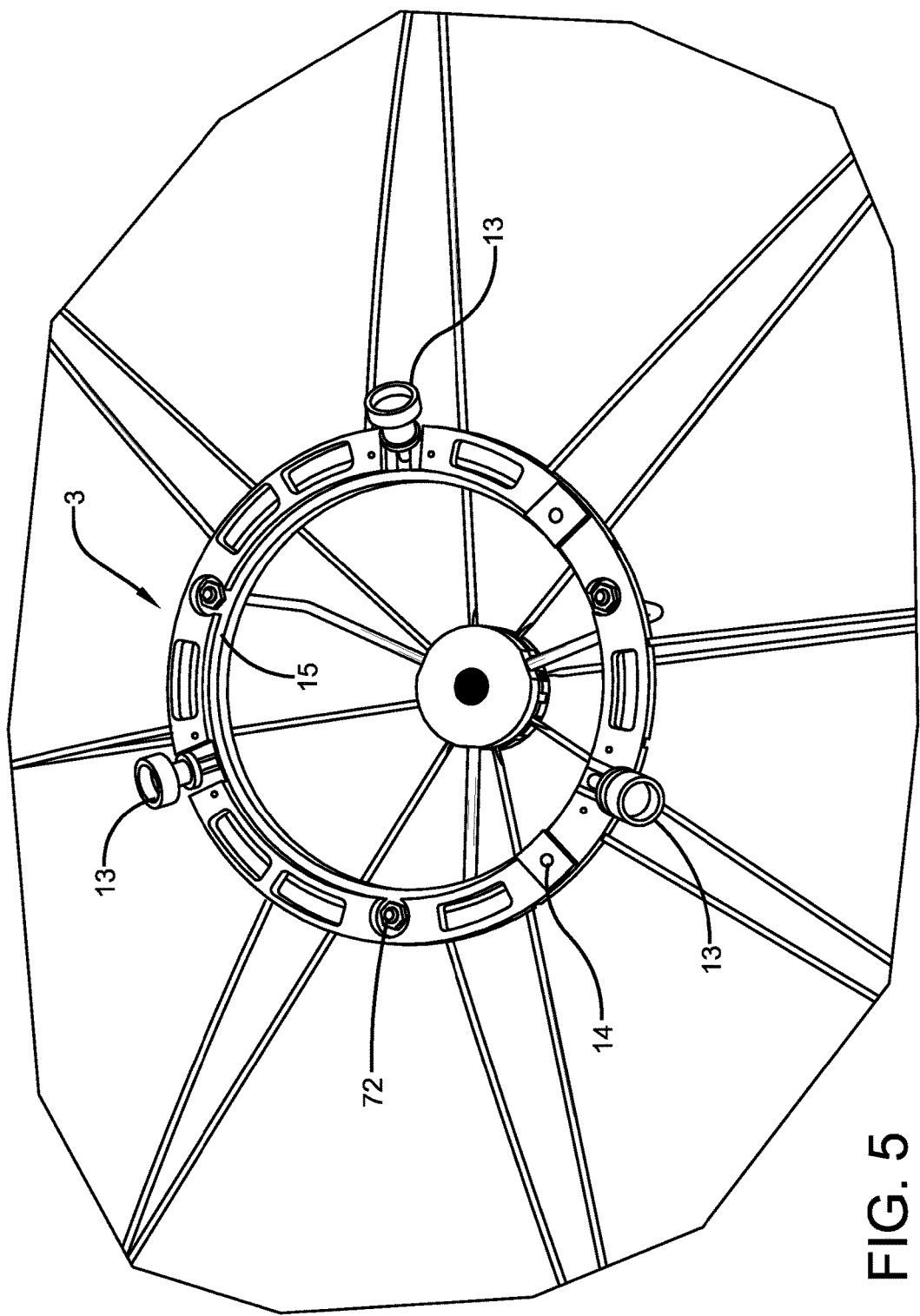
FIG. 5 is a rear perspective view of a portion of the soft box showing the back plate with the locking knobs undone and moved outward along with other components of the soft box
Figure 6:
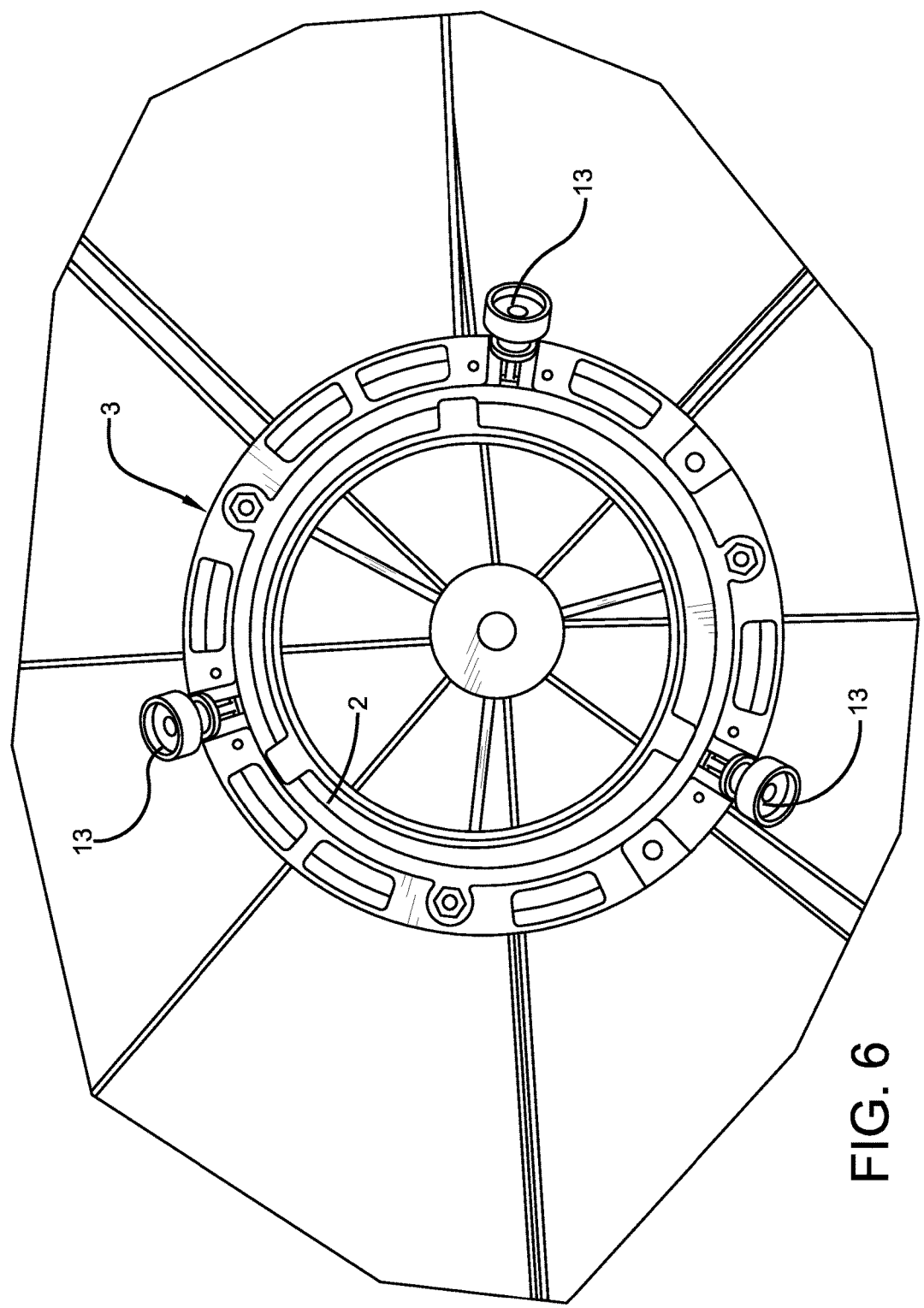
FIG. 6 is a rear perspective view of a portion of the soft box showing the back plate with the locking knobs undone and moved outward and the adapter ring placed in the channel along with other components of the soft box.
Figure 7:
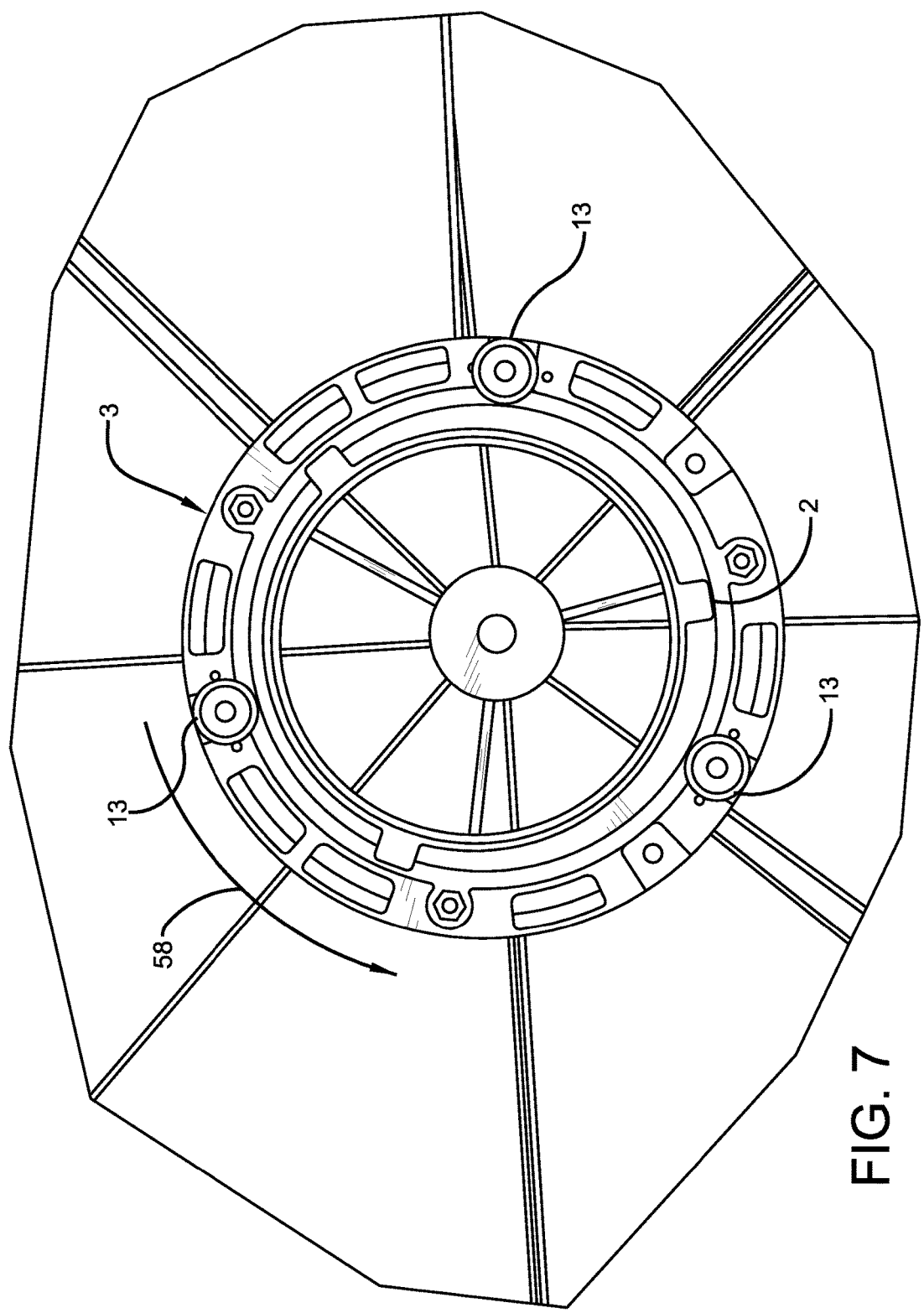
FIG. 7 is a is a rear perspective view of a portion of the soft box showing the back plate with the locking knobs and adapter ring in the first operative position along with other components of the soft box.
Figure 8:
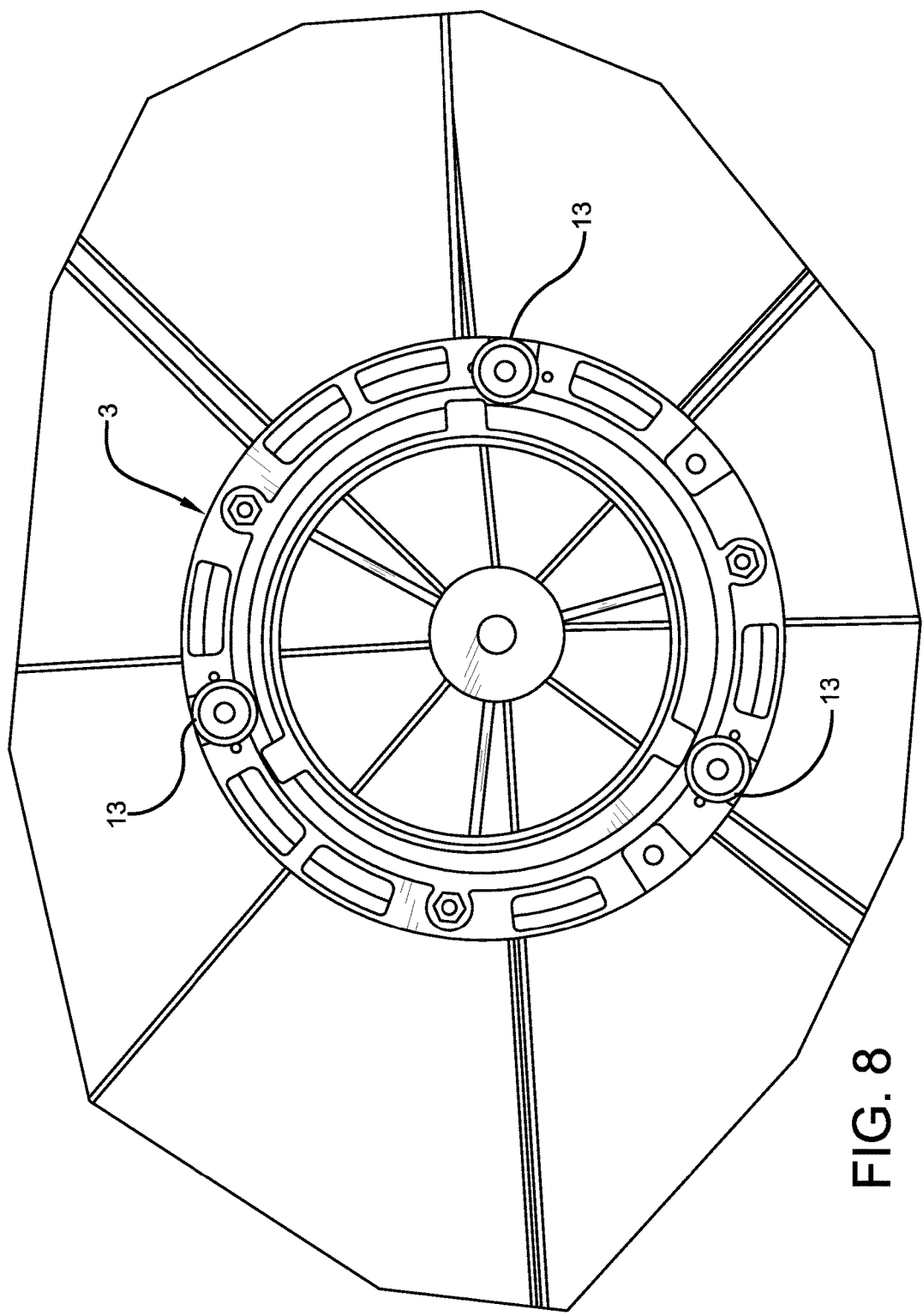
FIG. 8 is a rear perspective view of a portion of the soft box showing the back plate with the locking knobs and adapter ring in the second operative position along with other components of the soft box.
Figure 21:
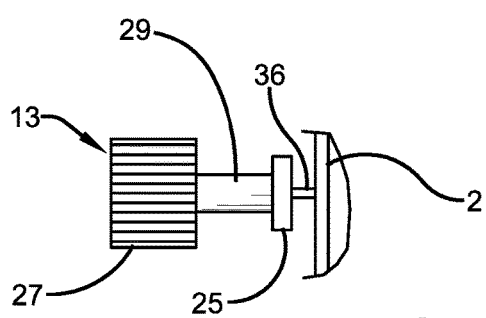
FIG. 21 is a side view of the locking knobs and the adapter ring in the first operative position.
Figure 22:
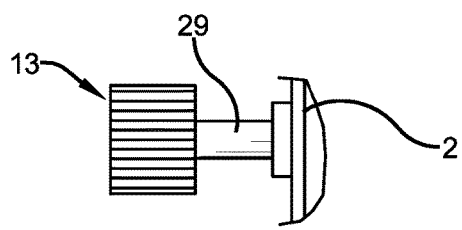
FIG. 22 is a side view of the locking knobs and the adapter ring in the second operative position.
Figure 23:
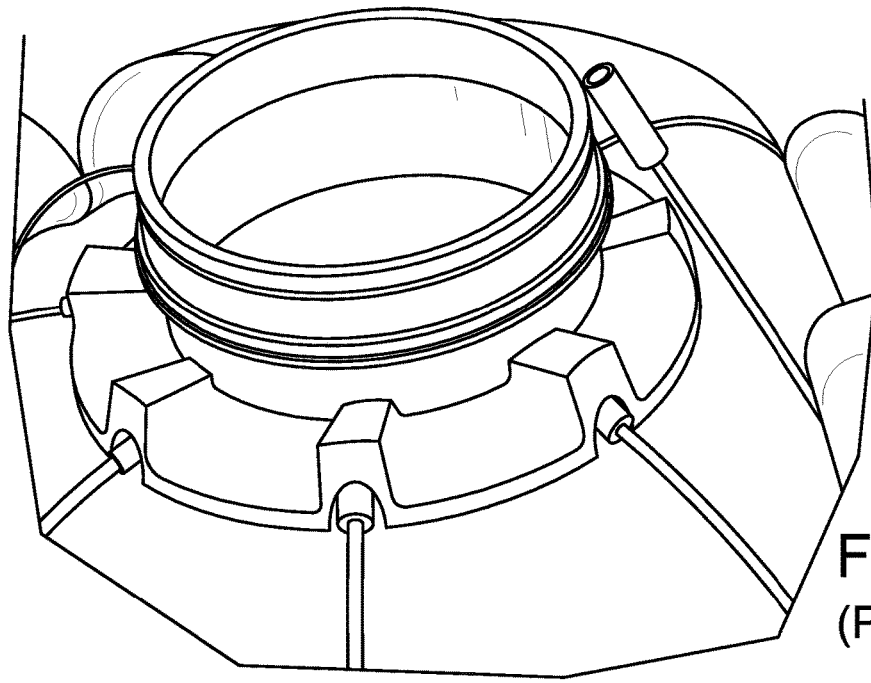
FIGS. 23-28 show portions of prior soft boxes or light beauty boxes.
Figure 24:
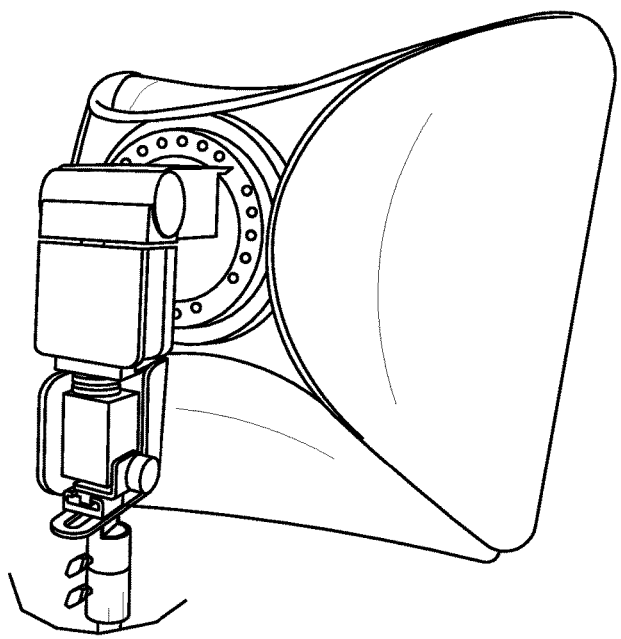
Figure 25:
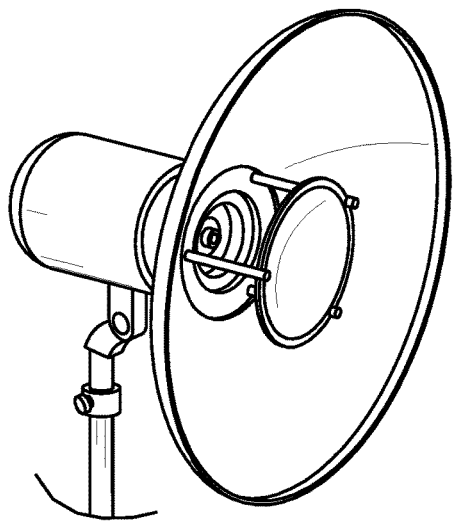
Figure 26:
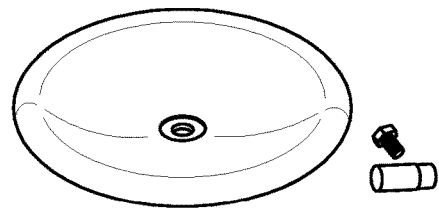
Figure 27:
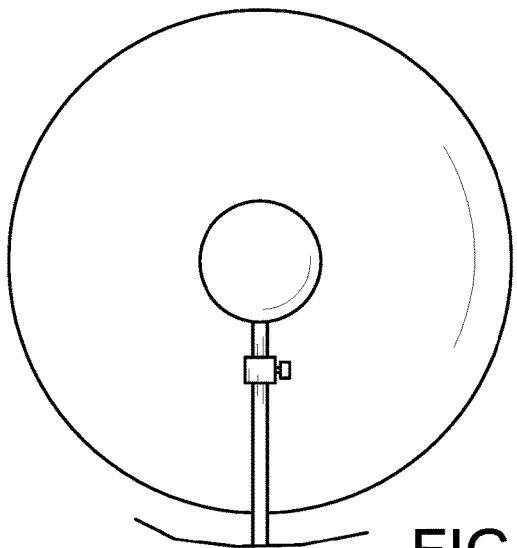
Figure 28:
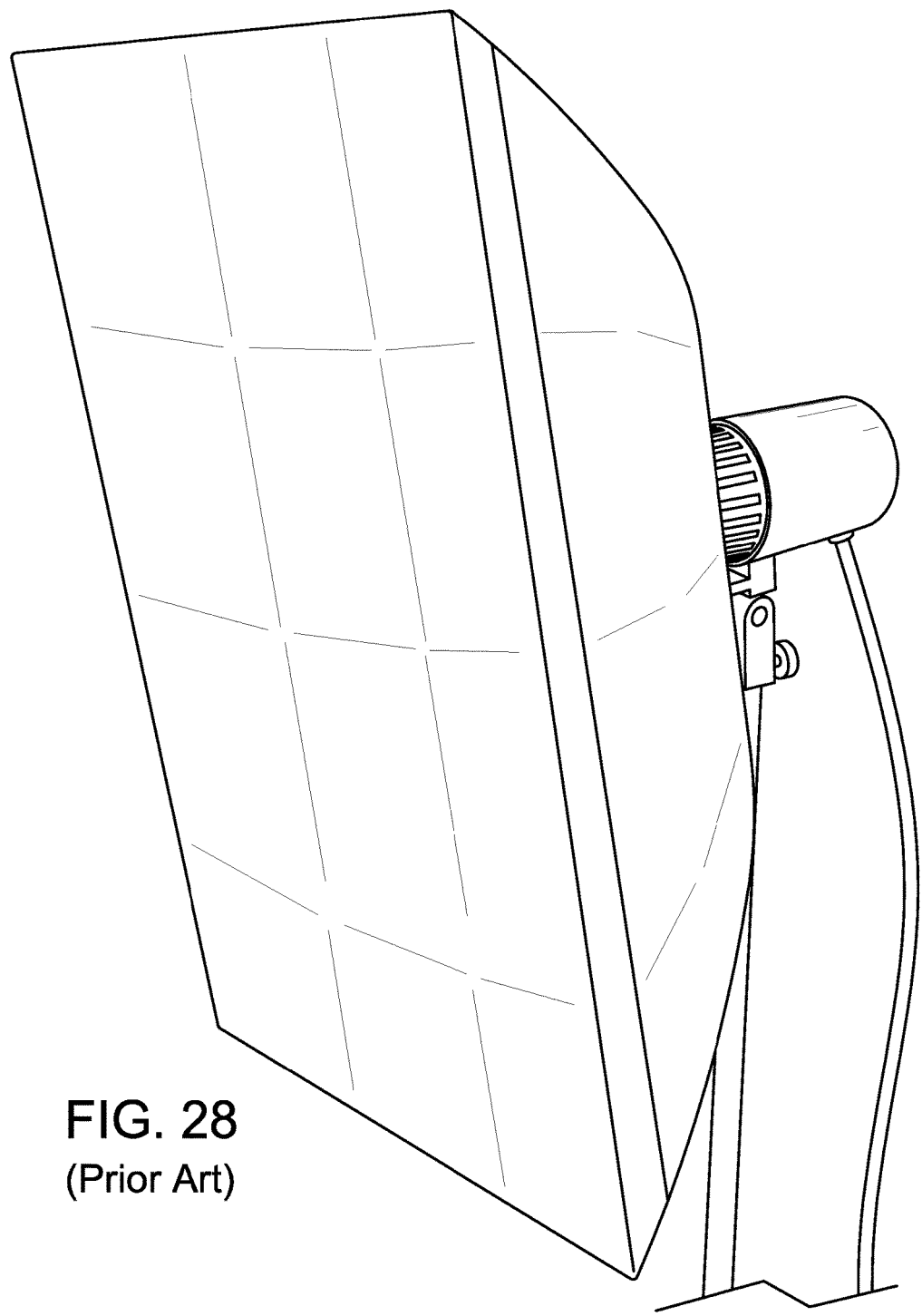

As illustrated in FIGS. 5-8, the locking knobs 13 tilt outwardly while remaining attached to the interchangeable back plate 3 via a pivot mechanism 36 (FIG. 29) to allow quick and easy insertion and removal of the adapter rings 2. Various ranges of tightening on the locking knobs 13 provide the ability for the adapter rings to rotate freely within the channel for turning the direction of the light modifier or soft box 30. As seen in FIGS. 21 and 22, each locking knob 13 includes a base 29 that has a handle 27 on one end and a contact plate 25 on the other end. The base 29 is narrower than the handle 27 and the contact plate 25. The locking knob 13 is threadily connected to an aperture in the back plate 3 such that turning the locking knob 13 clockwise moves the locking knob 13 towards the back plate 3 and turning it counter clockwise moves the locking knob 13 away from the back plate 3. Each locking knob 13 may be in a first operative position as shown in FIGS. 7 and 21 in which the contact plate 25 is spaced slightly above the adapter ring 2 or loosely contacts the adapter ring 2 to still retain the adapter ring 2 but enable the adapter ring 2 to freely rotate in the direction of the arrow 58 of FIG. 7. Each locking knob 13 may be in a second operative position as shown in FIGS. 8 and 22 in which the contact plate 25 contacts the adapter ring 2 and clamps or tightens the adapter ring 2 to the back plate 3 and prevents rotation of the adapter ring 2 relative to the back plate 3. The three knobs 13 arrangement circumferentially around the back plate 3 enables removal and reinsertion of various types of adapter rings. Also, tightening of the knobs 13 locks the adapter ring 2 in place, and loosening of the locking knobs 13 slightly enables rotation of the adapter ring while still secured in to the soft box 30. This allows a user to rotate a soft box that may be in the form of a rectangle both horizontal and vertical.

Figure 29:
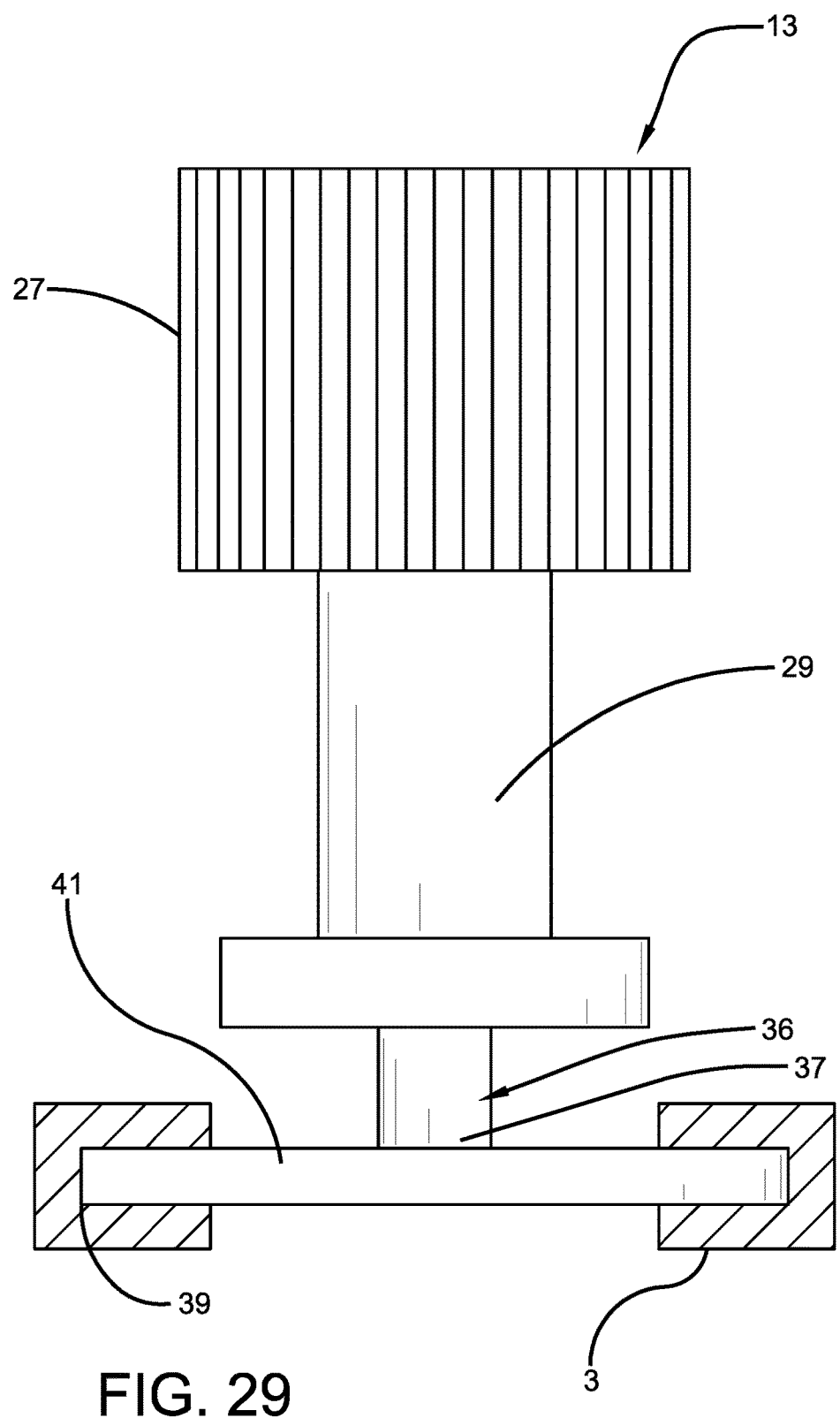
FIG. 29 shows a side view of the locking knob rotatably mounted in pockets of the back plate with portions of the back plate removed for illustrative purposes.
Figure 30:
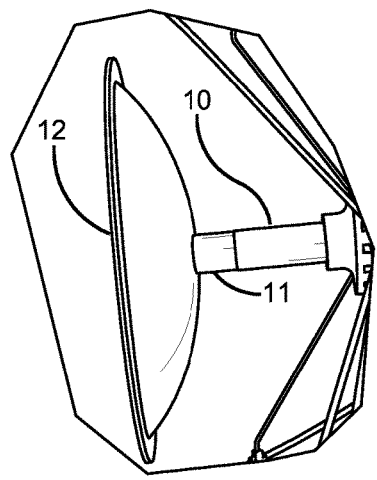
FIGS. 30-34 show views of how the deflector plate 12 is removably attached to the magnetic insert.
Figure 31:
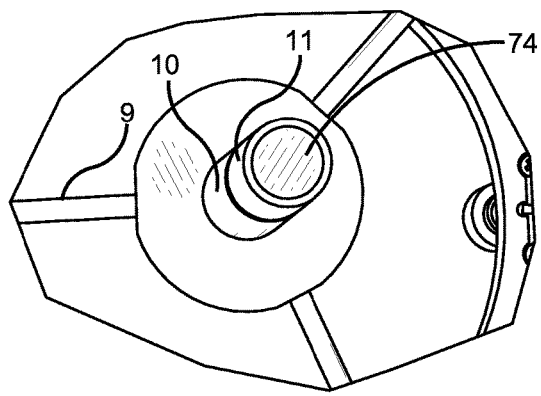
Figure 32:
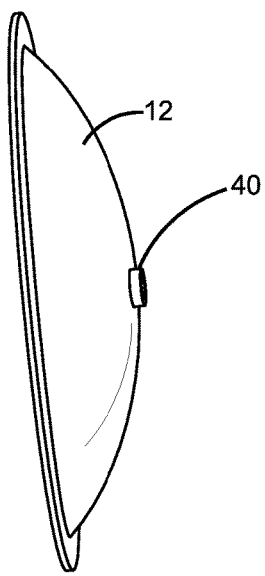
Figure 33:
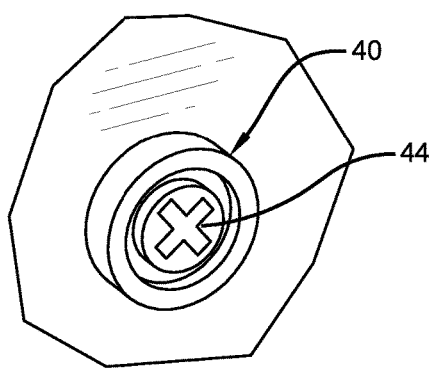
Figure 34:
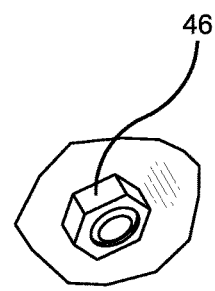

As illustrated in FIGS. 5 and 6, each of the locking knobs 13 may also be pivotally attach to the back plate by the hinge or pivot mechanism 36 so that the locking knobs 13 may pivot radially outward relative to the back plate 3 from the first or second operative position to a position outwardly away from the adapter ring and out of contact from the ring. This position enables removal of the adapter ring 2 from the channel 15 in the back plate and then insertion of another or the same adapter ring 2 into the channel 15 of the back plate. FIG. 29 shows an example of one pivot mechanism 36. In this example, the pivot mechanism 36 comprises a support rod 37 that is attached to the center of a pivot pin 41 that extends perpendicular to the support rod. The pivot pin 40 is rotatably received by pockets formed in the back plate 3 that define bearings 39 to allow pivoting of the locking knob. Adapter rings come in a variety of shapes and sizes to fit a variety of lighting fixtures.

Figure 9:
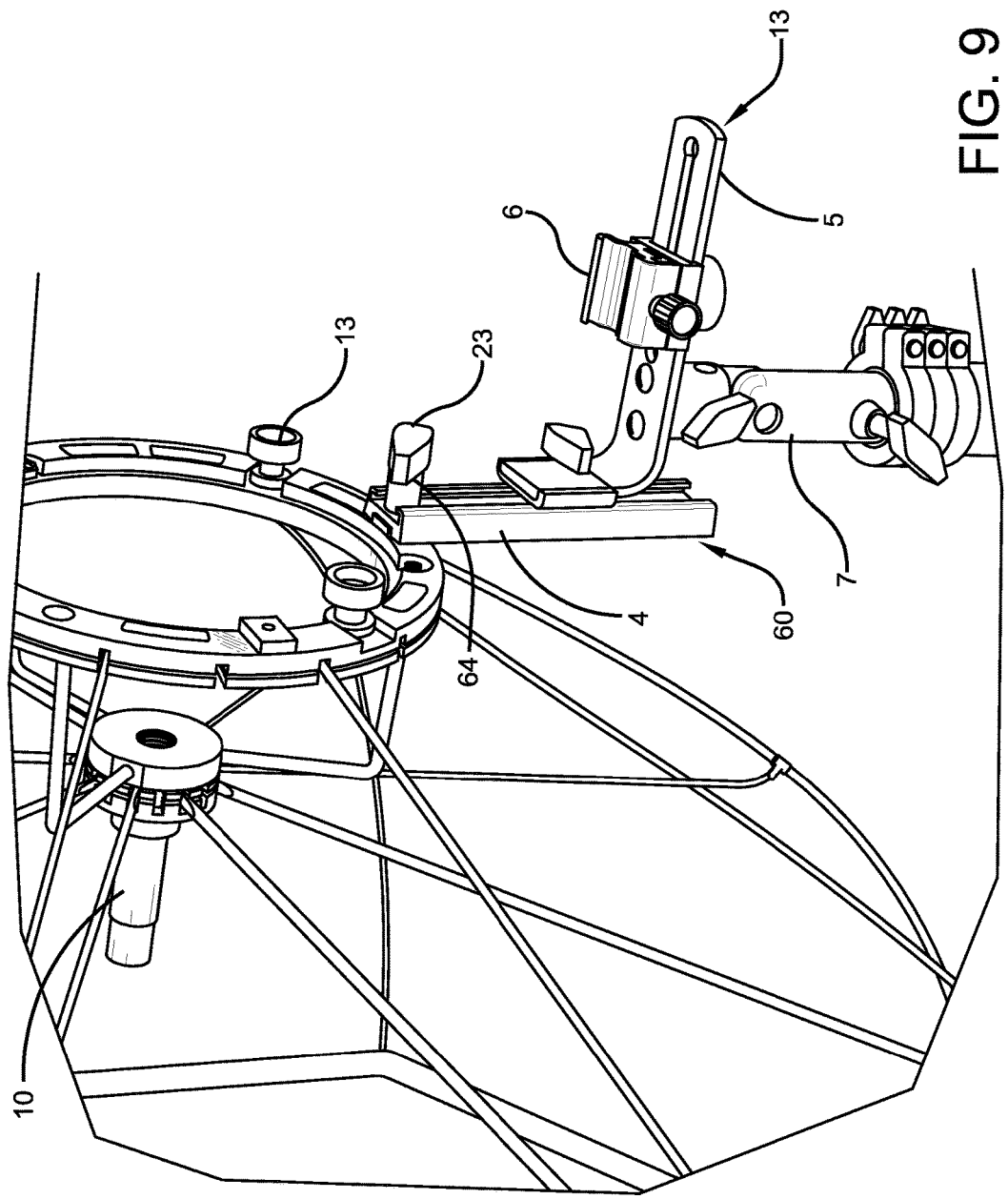
FIG. 9 is a right side and rear perspective view of a portion of the soft box without the cover and a speedlite optional bracket.
Figure 10:
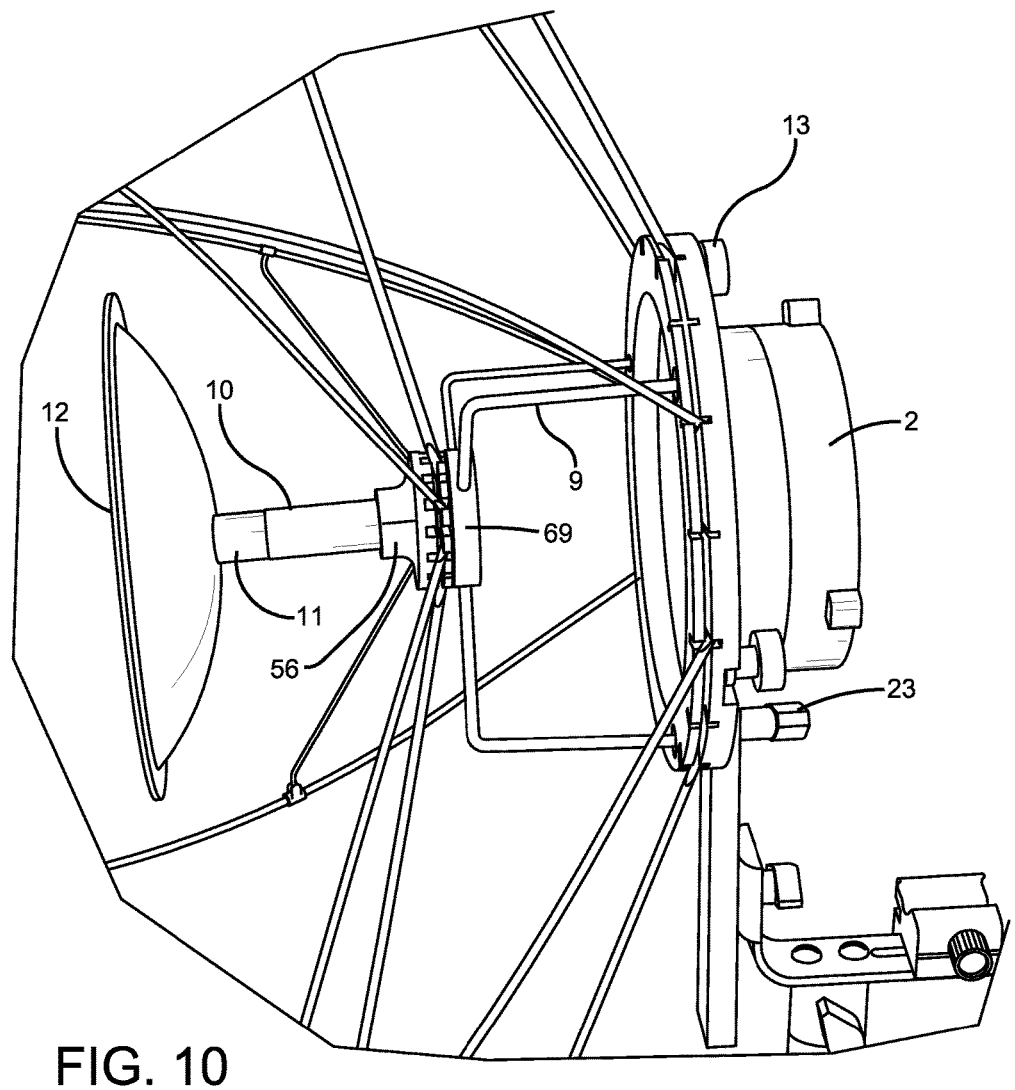
FIGS. 10 and 11 are a right side perspective views of a portion of the soft box without the cover.
Figure 11:
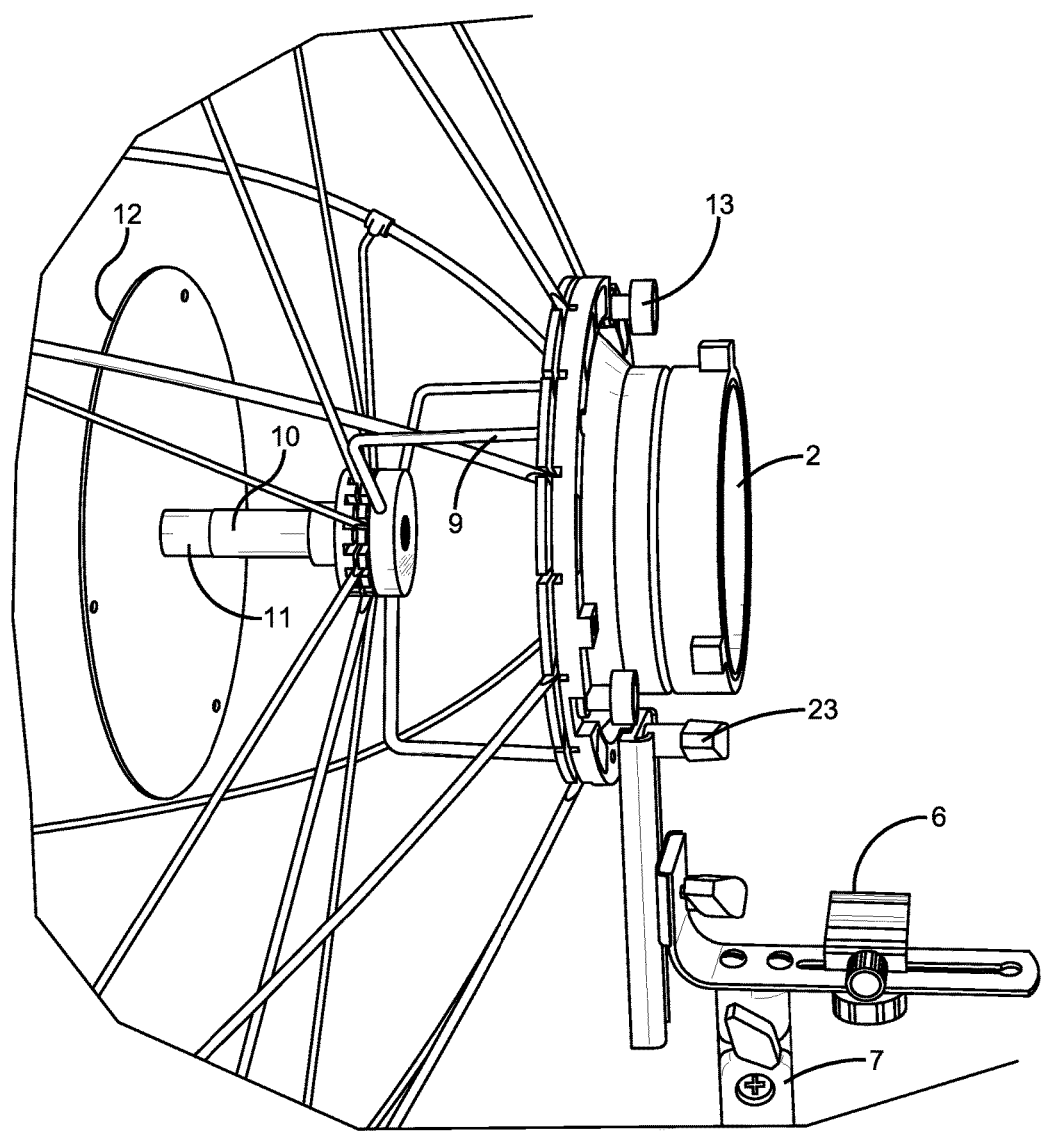
Figure 12:
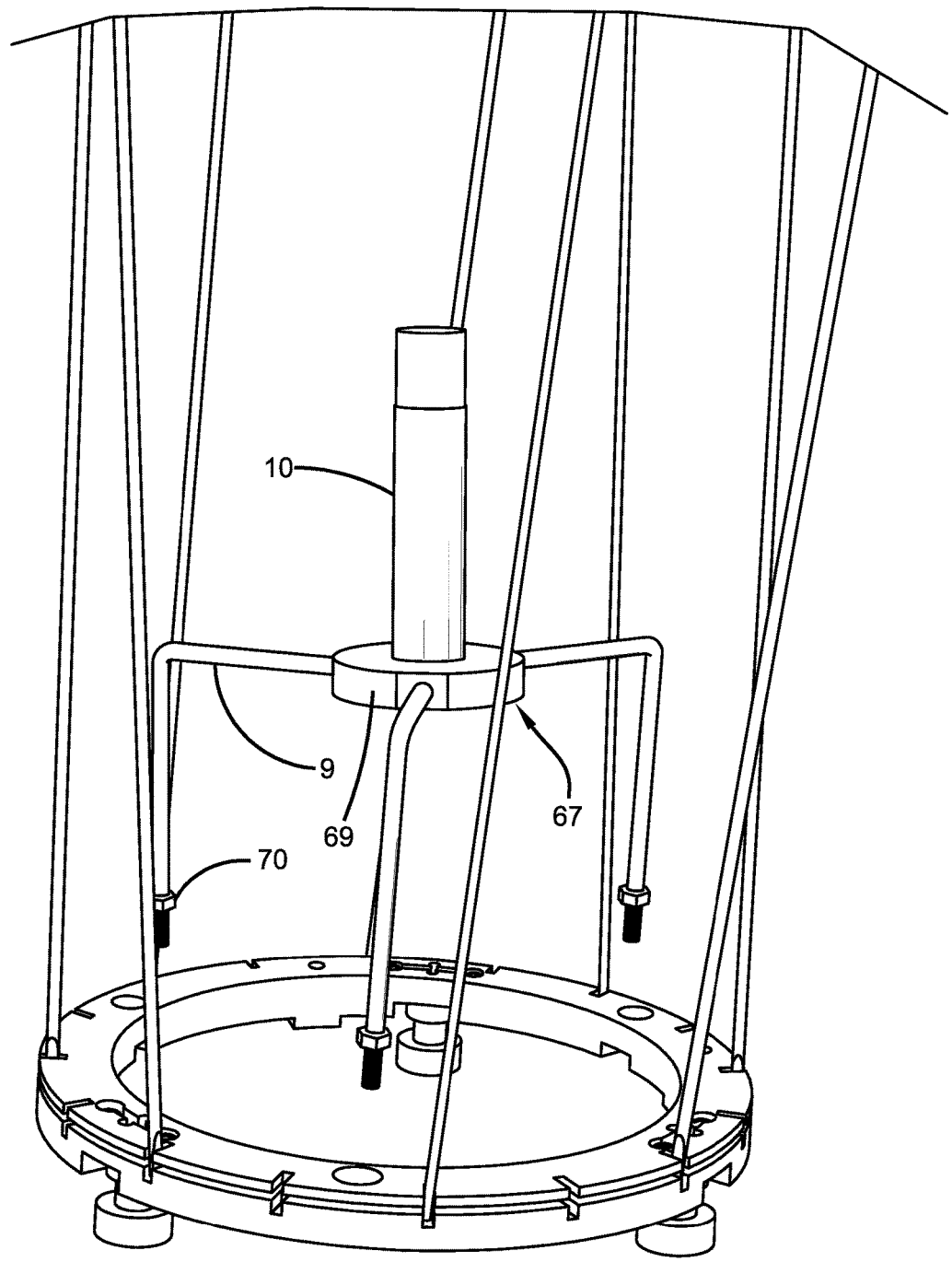
FIG. 12 is a perspective view of a portion of the soft box showing the threaded center post and spindle before being attached to the back plate.
Figure 13:
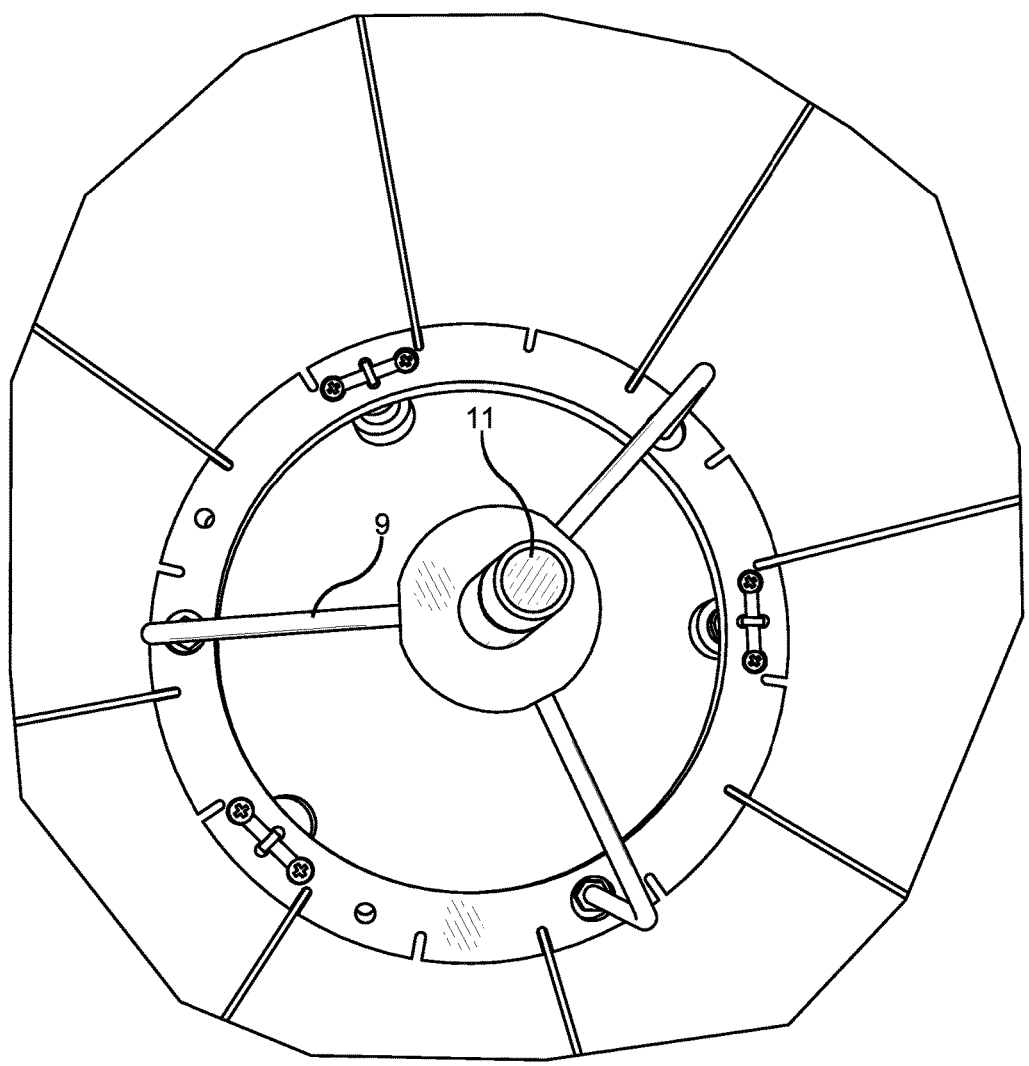
FIG. 13 is a front view of a portion of the soft box showing the magnet inserted into the center threaded post.
Figure 14:
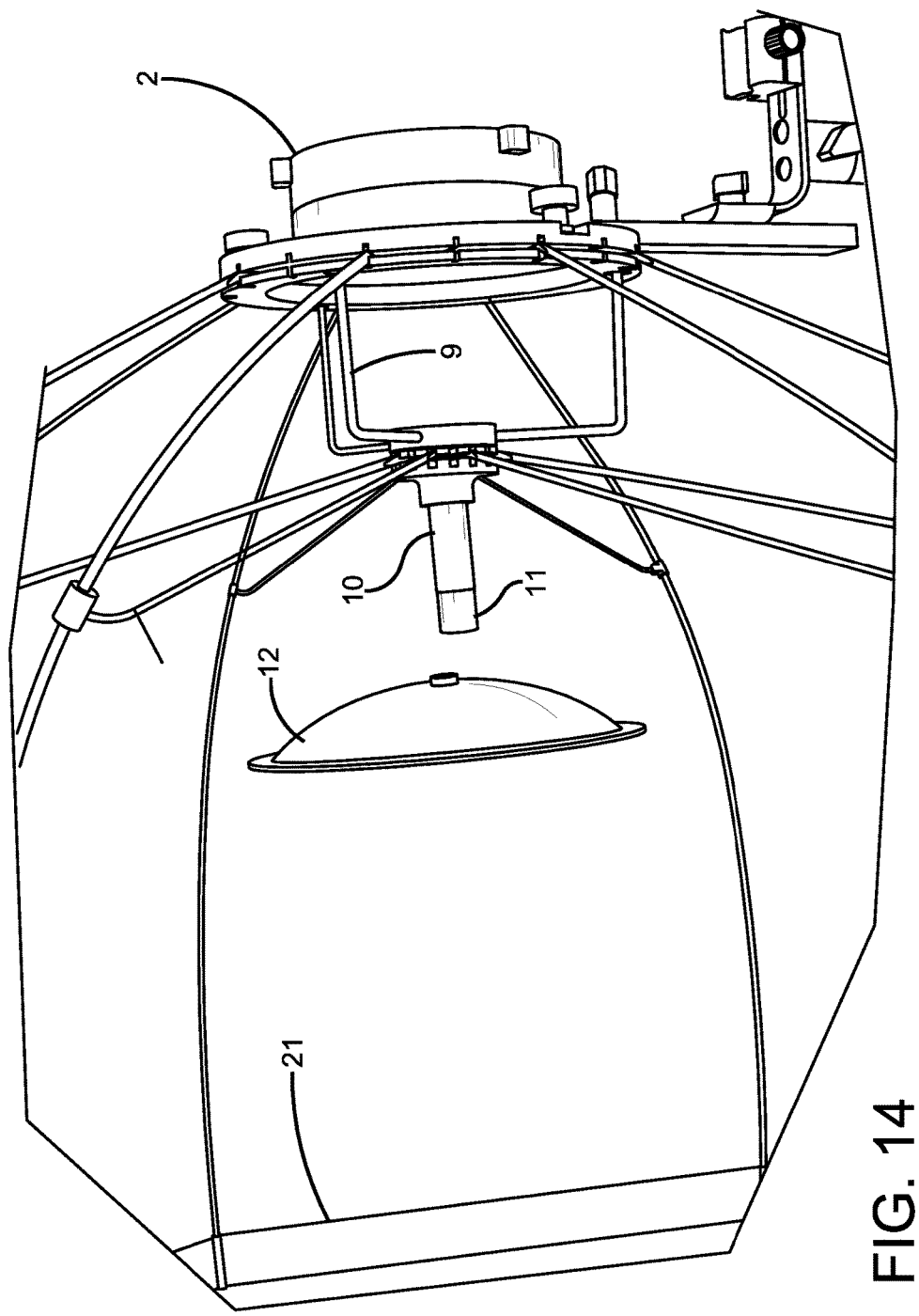
FIG. 14 is a right side view of a portion of the soft box illustrating the threaded center post and spindle before being attached to the back plate.
Figure 19:
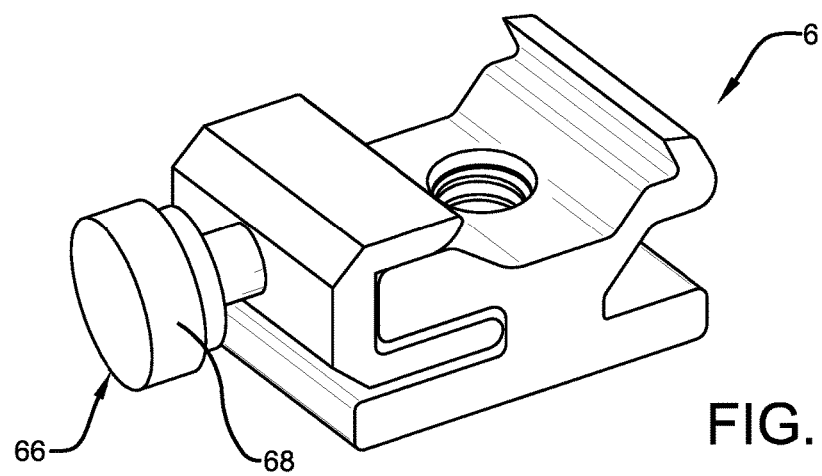
FIG. 19 is a perspective view of the removable channel plate of the soft box.

As illustrated in FIG. 5, a series of threaded screw taps 14 located on the outer most side of the interchangeable back plate 3 are used to attach a variety of mounts used for additional light fixtures that do not utilize a traditional adapter ring such as speedlites. As seen in FIGS. 9-11, an L-Shaped mount 60 comprises upper and lower linear plates 4, 5 that are attached to each other. The upper linear plate 4 is oriented vertically and has an open center channel 62 that receives a locking knob 23. The threaded shaft of the locking knob extends through the channel 62 and threadliy engages a threaded screw tap 14 to attach the first linear plate 4 to the interchangeable back plate 3. The locking knob 23 may be turned clockwise into the screw tap 14 until the knob portion 64 engages the upper linear plate 4 tightly against the back plate 3 to lock the upper linear plate 4 to the back plate 3. The locking knob 23 may lock the upper linear plate 4 to the back plate 3 at various locations along the open center channel 62 that correspond to the different heights of the lower linear plate 5, thereby allowing the height of the lower linear plate 5 to be adjusted. The lower linear plate 5 is generally horizontal and is configured to attach various lights either through a removable channel plate 6 (FIG. 19) or directly onto a screw head (not shown). A fastener 66 (FIG. 19) attaches the channel plate 6 to the lower linear plate 5. Turning a handle 68 (FIG. 19) of the fastener 66 counter clockwise disengages the channel plate 6 from the lower linear plate 5 to enable the channel plate 6 to be removed from the lower linear plate 5. This lower linear plate 5 may also include a bottom channel 7 to attach the structure onto a traditional light stand 8. Alternatively, the adapter ring 2 may also have a threaded screw tap for attachment of the mount for a speedlite.

As seen in FIGS. 10-14, a support spindle 67 (FIG. 12) is provided. The support spindle 67 includes a three-spindle post 69 that is attached to the bottom of the interchangeable back plate 3 by three spindle rods 9. Each spindle rod 9 has a threaded free end that is inserted into corresponding apertures of the back plate 3. A stop member 70 (FIG. 12) is attached to the each spindle and located adjacent the threaded end. The stop members 70 engage the back plate to prevent further insertion of the spindles into the apertures. Nuts 72 (FIG. 5) are then fastened to the threaded ends of the spindle rods 9 to secure the spindle support post 69 to the backing plate. The support spindle 67 provides spacing between the magnetic insert 11 and the interchangeable back plate 3. This space is required in order to house the light fixture which can protrude past the inside edge of the interchangeable back plate 3. The support spindle 67 or three spindle-post 69 may be adjusted in height (as view in FIG. 12) depending upon the size of the structure. This may be accomplished by having the stop members 70 threaded on the spindle rods 9. Turning the stop members 70 moves them along the spindles at selective distances from the end to adjust the height of the spindle post 69.

Figure 35:
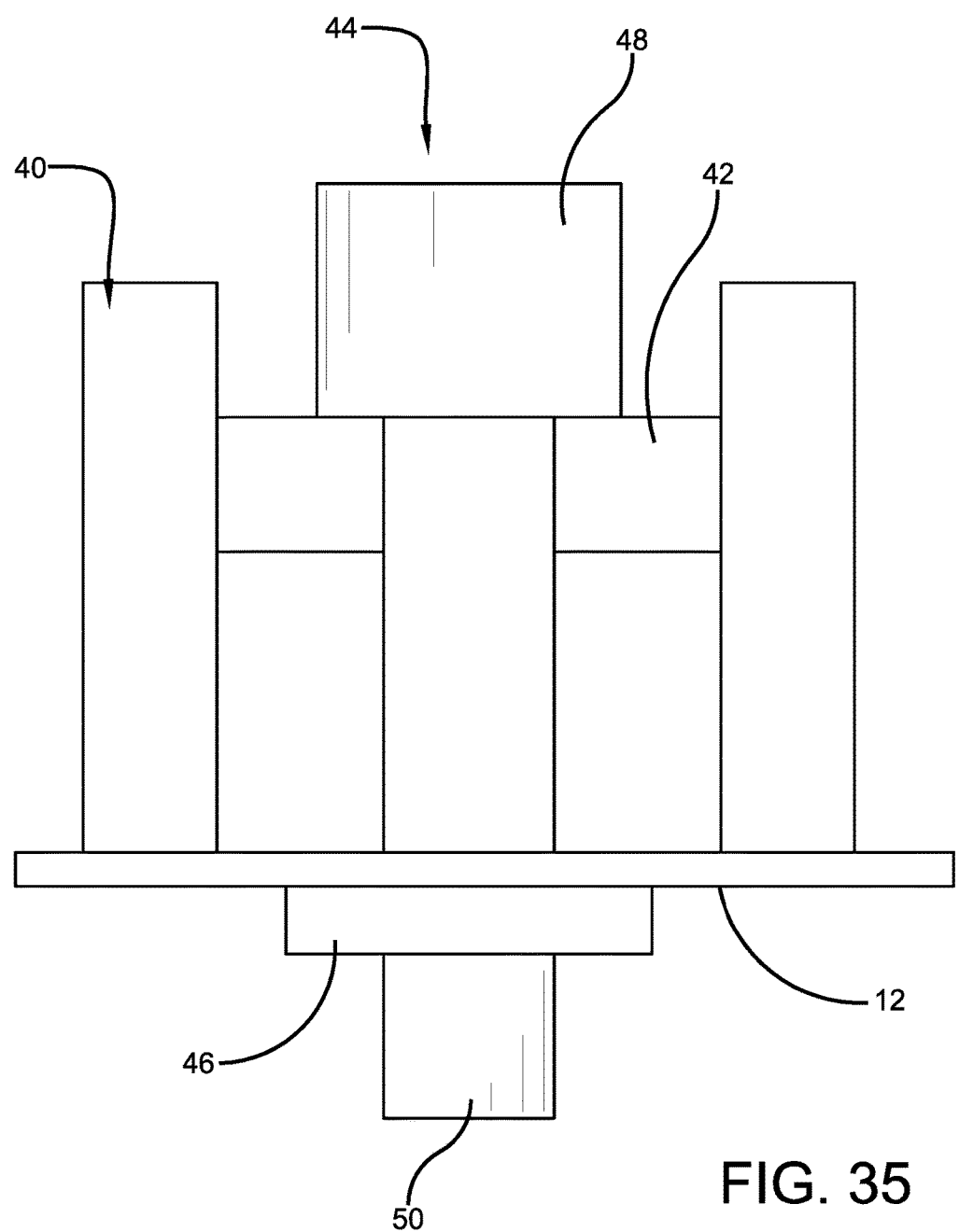
FIG. 35 is a side sectional view showing the ring magnet attached to the deflector plate by the screw and nut arrangement.

The support spindle 67 includes a hollow threaded shaft 10 that is attached to the three-spindle post 69. The shaft 10 threadily receives a magnetic insert 11 made of iron. By having this section threaded, magnetic inserts 11 can vary in length depending upon the size of the final product. A metal deflector plate 12 (FIG. 14) is then removably attached to the magnetic insert 11 and held to the magnetic insert 11 by magnetic force and thus, creating the desired lighting effect without the use of additional tools or parts that are easy to lose. FIGS. 30-35 illustrate how the deflector plate 12 is removably attached to the magnetic insert. First a ring magnet 40 is fastened to the deflector plate 12 by a screw 44 and nut 46 arrangement. Specifically as best illustrated in FIG. 35, the ring magnet 40 includes opposite projections or a step portion 42 that extends radially inward from the inner side of the ring magnet. The head 48 of the screw 44 engages this step portion 42 to fasten the ring magnet 40 to the deflector plate 12. The shaft 50 of the screw extends through the deflector plate 12 and the nut 46 is fastened to the free end of the shaft of the screw on the opposite side of the deflector plate to fasten the screw and ring magnet to the deflector plate 12. Then, the magnet insert 11 is threadily connected to the shaft 10. Alternatively, this step can be performed before the ring magnet 40 is fastened to the deflector plate 12. Then, the concave hole or recess 74 defined by the end of the magnetic insert 11 receives the head 48 of the screw 44 and the ring magnet 40 engages or contacts the insert 11. The magnetic force of the ring magnet 40 and magnetic insert 11 holds or removably attaches the deflector plate 12 to the magnetic insert 11.

Figure 36:
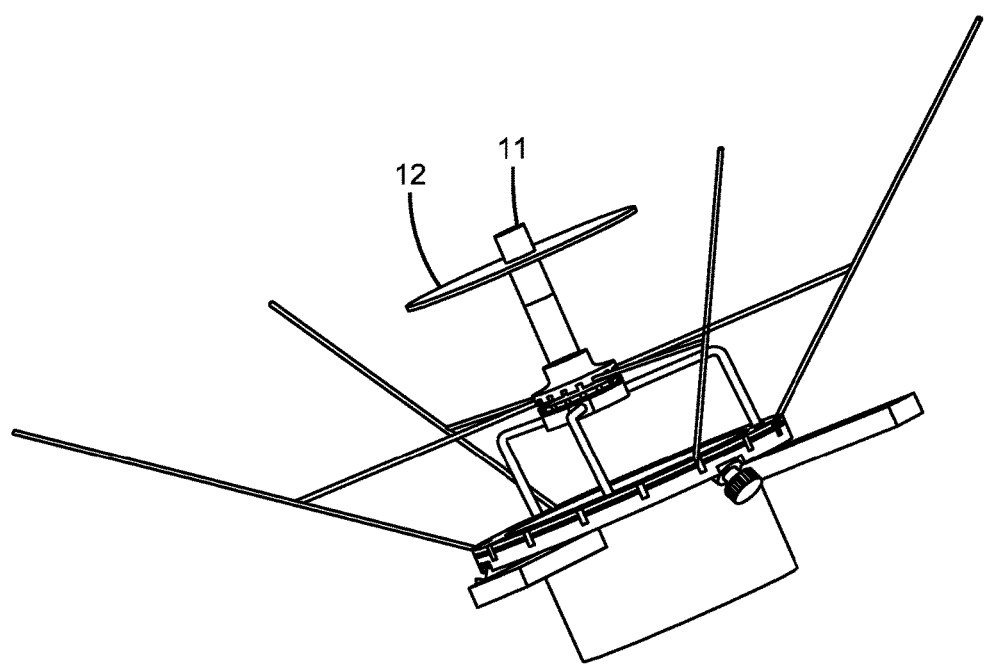
FIGS. 36 and 37 are side perspective view of a portion of the soft box showing the magnetic insert extending through the deflector plate according to another embodiment of the present invention.
Figure 37:
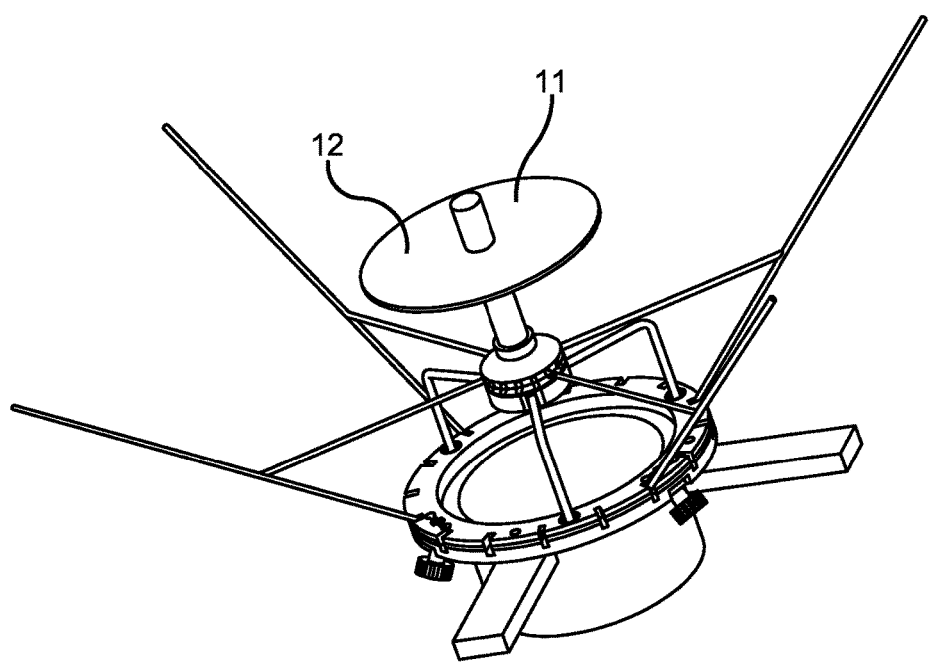

Alternatively, the hollow center shaft 10 may not be threaded and instead the magnet insert 11 may be inserted into the shaft and permanently attached to the shaft 10 by adhesive so that user cannot remove the insert 11. In other embodiments, the magnetic insert 11 extends through the deflector plate 12 and is magnetically attached thereto as seen in FIGS. 36 and 37.

Figure 15:
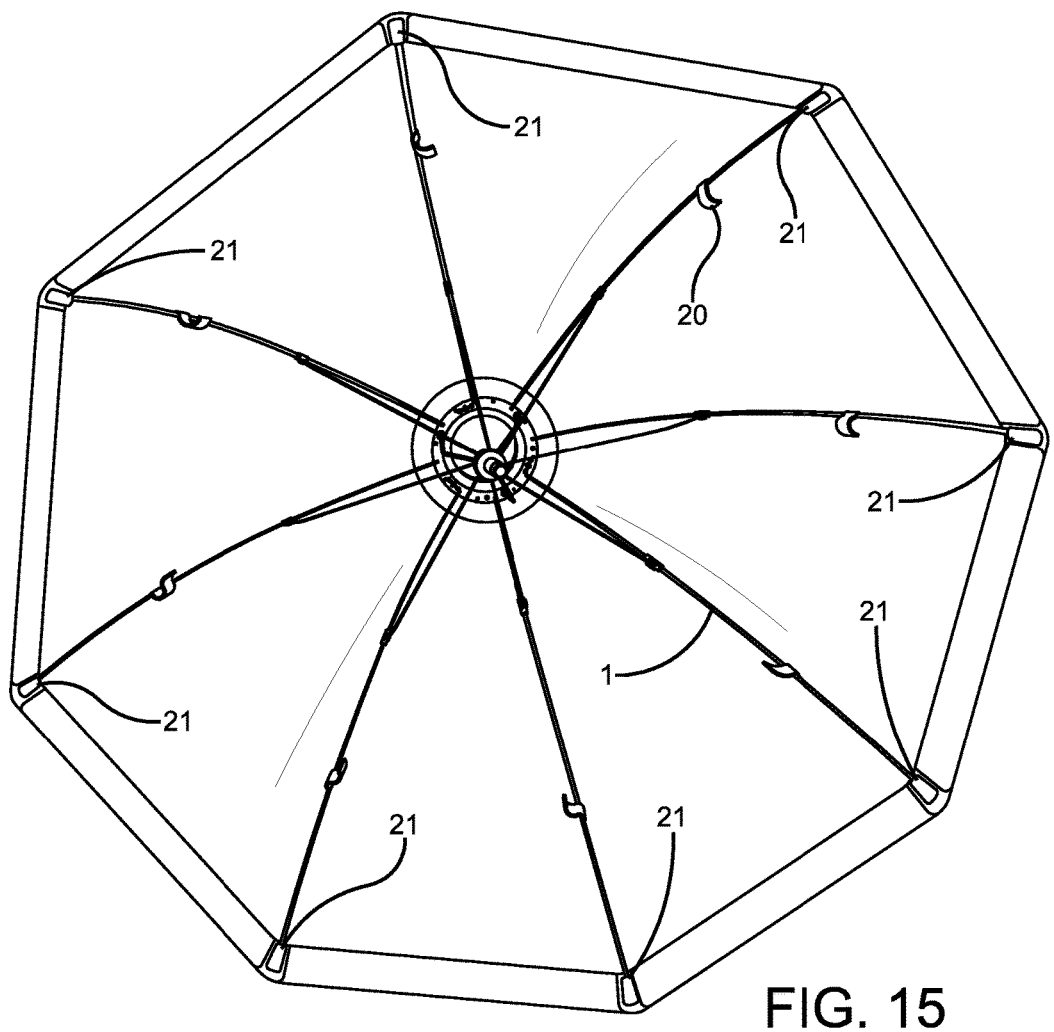
FIG. 15 is a front view of a portion of the soft box showing the fabric shell attached to the frame via pockets that slidingly receive the ribs and hook and loop tabs that wrap around the ribs.
Figure 16:
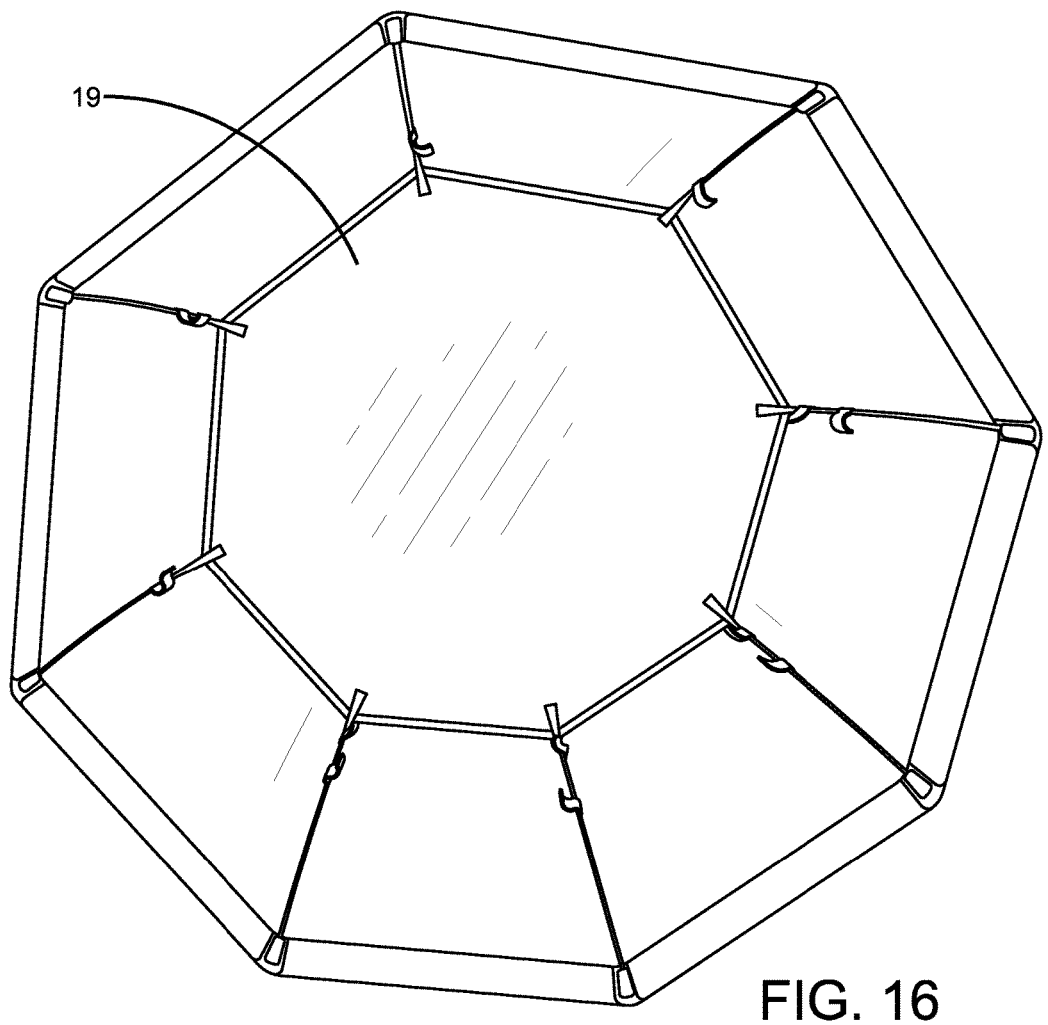
FIG. 16 is a front view of a portion of the soft box showing the fabric shell with inner diffusion panel attached to the hook and loop tabs the helps soften projected light.
Figure 17:
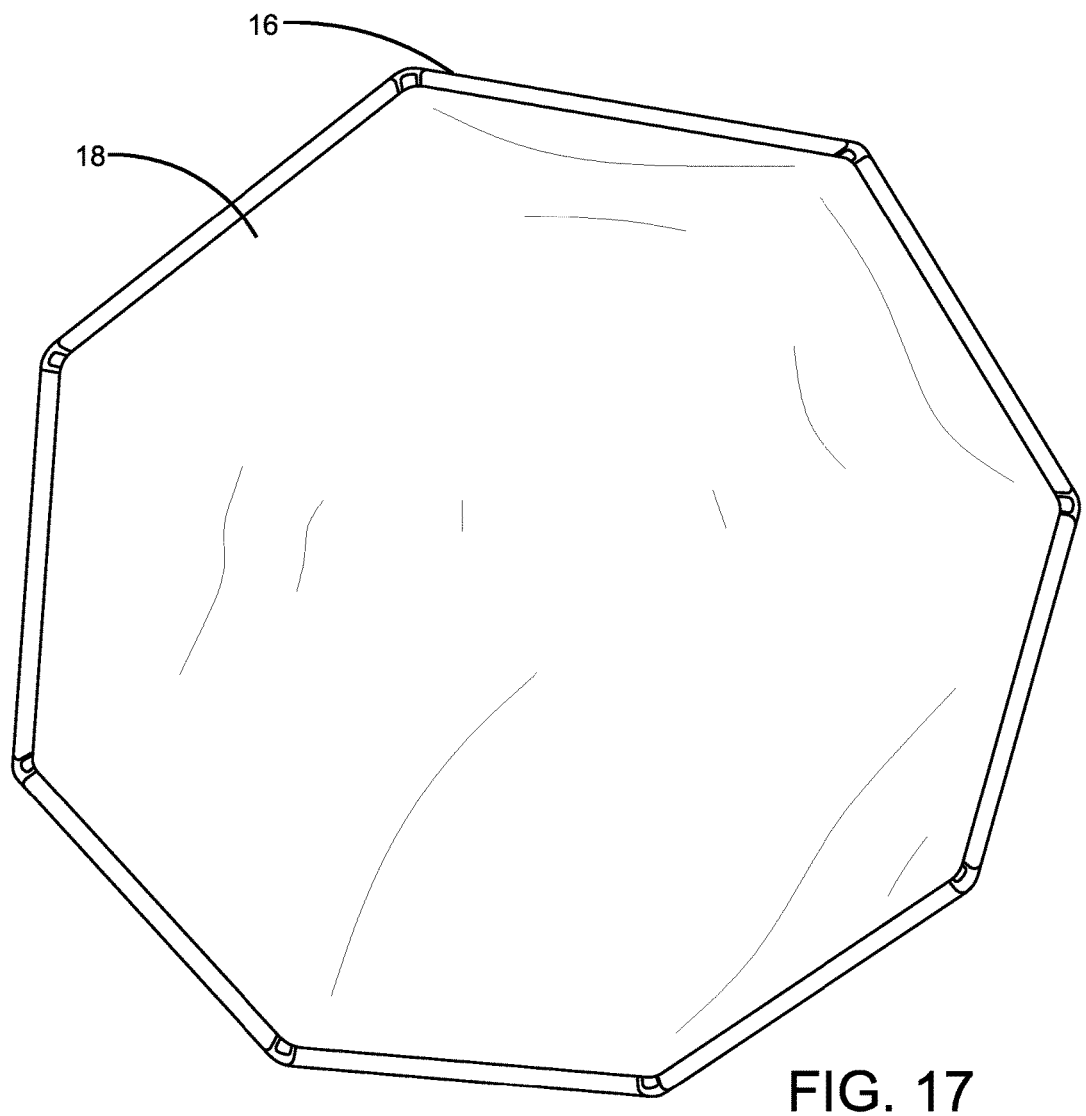
FIG. 17 is a front view of a portion of the soft box showing the fabric shell shown with the diffusion panel attached through the hook and loop tape.
Figure 18:
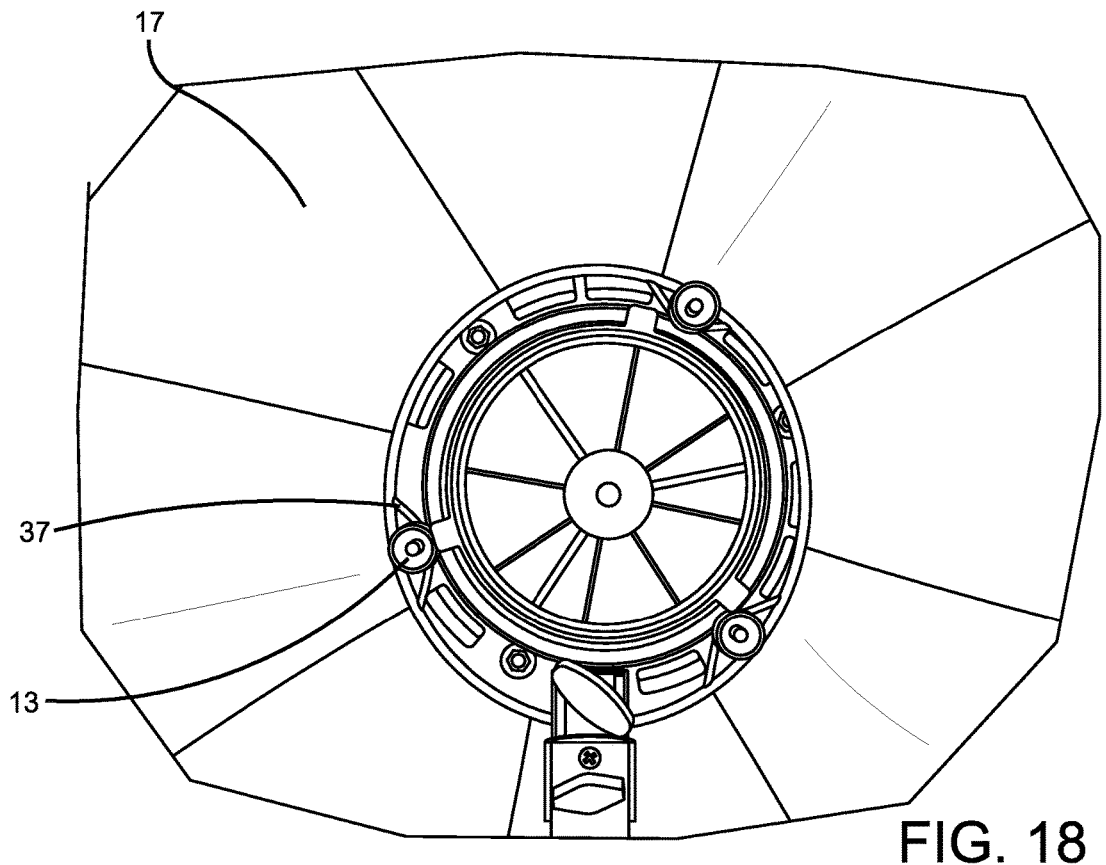
FIG. 18 is a rear view of the fabric shell shown with the inner diffusion panel attached to hook and loop tabs that helps soften projected light.
Figure 20:
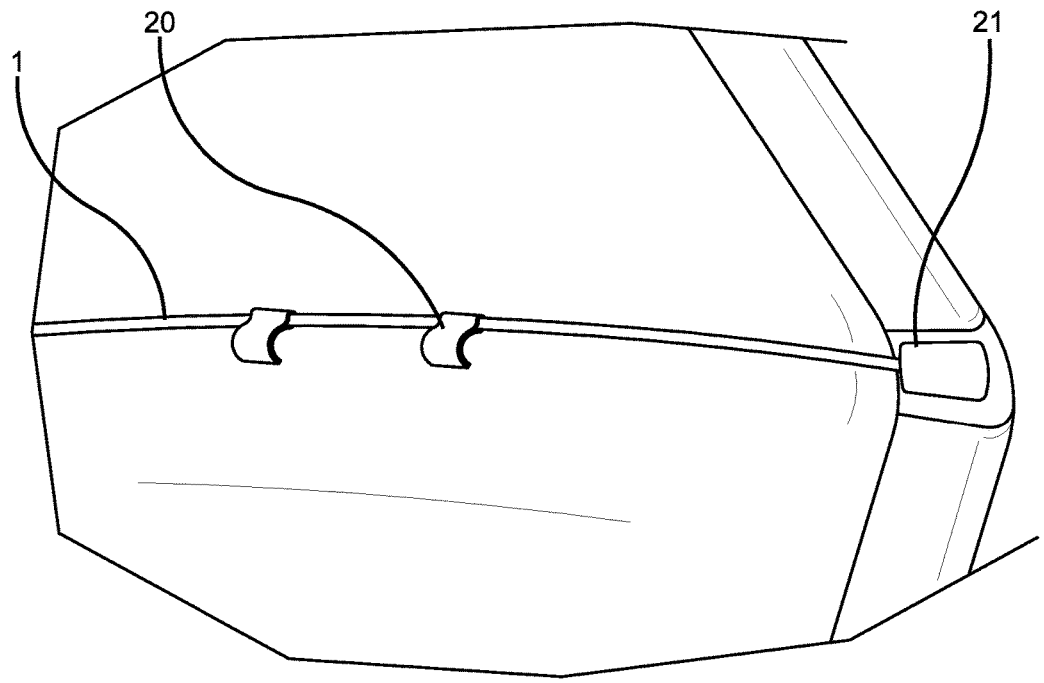
FIG. 20 is an enlarged portion of FIG. 17 showing ribs inserted into the pockets and hook and loop tabs.

As illustrated in FIGS. 15 and 18, the frame can be structured using up to 16 ribs 1 to hold the fabric shell 17. The ribs 1 may be in varying lengths and thicknesses depending upon the final size of the soft box. The invention may be created in a variety of forms including square, rectangular, circular, octagon and other potential combinations that can be created by the invention. The fabric shell 17 can be attached to the frame by any suitable attachment such as rib pockets 21, thread, or glue as illustrated in FIGS. 15 and 20. The front side or interior of the fabric shell is reflective. As seen in FIGS. 15 and 20, a series of loop tape tabs 20 are attached to the fabric shell 17 that wrap around the rib 1 securing the fabric shell 17 in place as well as serving as an attachment point for an inner diffusion panel 19 (FIG. 16). The fabric shell utilizes loop tape around the outer edge 16 for attachment of a second diffusion panel 18 (FIG. 17) designed to soften the light output. The fabric shell 17 stays in place around the interchangeable back plate 3 by tabs 37 that wrap around the locking knobs 13.

Thus, the soft box 30 includes an interchangeable back plate for attachment onto a variety of light sources, a collapsible frame featuring the center threaded shaft for insertion of a magnetic insert for removable attachment of the deflector plate. The interchangeable back plate includes a series of locking knobs that unscrew and tilt outward while remaining in place exposing the channel for insertion of a variety of adapter rings designed each to fit specific brands of light sources. The addition of threaded screw taps are present on the invention allowing for an additional bracket attachment for light sources commonly referred to as speed lights or flashes. The collapsible frame is provided in the manner of an umbrella frame with ribs that project outward providing the curvature of the assembled light modifier. The magnetic insert can be threadily inserted at varying lengths.

The magnetic insert attaches to a round deflector plate in varying sizes that alters the light pattern projected from the invention. The umbrella frame is enclosed in a fabric shell with a reflective interior that contains the light emitted from the light source.

The present invention provides a soft box that is provided with an interchangeable back plate and threaded screws taps to mount to a variety of light sources. This creates a completely interchangeable soft box removing the expense of separate adapter rings for each light they own and allowing the user to travel with fewer products.

The invention also comprises a collapsible umbrella style frame for quick and easy set up of the light modifier including a center threaded shaft with included magnetic insert that can be permanently left in the place allowing the user to attach a deflector plate in seconds without the hassle of dealing with extra screws or parts that can be easily lost.

Although various embodiments of the disclosed soft box have been shown and described, modifications may occur to those skilled in the art upon reading the specification. The present application includes such modifications and is limited only by the scope of the claims.

What is claimed is:

1. A soft box comprising:
 a collapsible frame, wherein the collapsible frame supports a fabric shell;
 a back plate;
 a support spindle;
 a plurality of support rods extending from the back plate, wherein the plurality of support rods are circumferentially spaced about the back plate, wherein the support rods are operatively attached to the support spindle; and
 a deflector plate, wherein the deflector plate is removably attached to the support spindle by magnetic force.

2. The soft box of claim 1, further comprising a magnet, wherein the magnet is attached to the deflector plate, wherein the magnet is configured to removably attach the deflector plate to the support spindle by magnetic force.

3. The soft box of claim 2, further comprising a fastener, wherein the magnet is attached to the deflector plate by the fastener.

4. The soft box of claim 2, further comprising a magnetic insert, wherein the magnetic insert is attached to the support spindle, wherein the magnet engages the magnetic insert to removably attach the deflector plate to the support spindle by magnetic force.

5. The soft box of claim 4, wherein the magnetic insert is threadily connected to the support spindle.

6. The soft box of claim 1, further comprising a runner and a plurality of stretcher rods, wherein the frame comprises a plurality of ribs, wherein each of the stretcher rods includes a first end and a second end, wherein the first end is connected to one of the ribs, wherein the second end is connected to the runner, wherein the support spindle extends through the runner.

7. The soft box of claim 1, further comprising at least one locking knob, wherein the at least one locking knob is pivotally attached to the back plate, wherein the at least one locking knob is configured to removably attach an adapter ring to the back plate, wherein the at least one locking knob is configured to be in a first position that attaches the adapter ring to the back plate such that rotation of the adapter ring relative to the back plate is prevented, wherein the at least one locking knob tilts radially outwardly relative to the back plate while remaining attached to the back plate in a second position to enable removal of the adapter ring.

8. The soft box of claim 7, further comprising a mount, wherein the mount is attached to the back plate, wherein the mount is configured to attach to a light fixture that does not use the adapter ring to attach the light fixture to the soft box.

9. A soft box comprising:
 a collapsible frame, wherein the collapsible frame supports a fabric shell;
 a backplate;
 a support spindle;
 a plurality of support rods extending from the back plate, wherein the plurality of support rods are circumferentially spaced about the back plate, wherein the support rods are operatively attached to the support spindle; and
 at least one locking knob, wherein the at least one locking knob is pivotally attached to the back plate, wherein the at least one locking knob is configured to removably attach an adapter ring to the back plate, wherein the at least one locking knob is configured to be in a first position that attaches the adapter ring to the back plate such that rotation of the adapter ring relative to the back plate is prevented, wherein the at least one locking knob tilts radially outwardly relative to the back plate while remaining attached to the back plate in a second position to enable removal of the adapter ring.

10. The soft box of claim 9, wherein the at least one locking knob is configured to be in a third position that attaches the adapter ring to the back plate but enables rotation of the adapter ring relative to the back plate.

11. The soft box of claim 10, wherein the back plate includes a channel, wherein the channel is configured to receive the adapter ring.

12. The soft box of claim 9, further comprising a mount, wherein the mount is attached to the back plate, wherein the mount is configured to attach to a light fixture that does not use the adapter ring to attach the light fixture to the soft box.

13. The soft box of claim 8, further comprising a plurality of tabs and a plurality of locking knobs, wherein the locking knobs are pivotally attached to the back plate and spaced circumferentially around the back plate, wherein the locking knobs are configured to removably attach the adapter ring to the back plate, wherein each of the locking knobs are configured to be in a first position that attaches the adapter ring to the back plate such that rotation of the adapter ring relative to the back plate is prevented, wherein each of the locking knobs tilts radially outwardly relative to the back plate while remaining attached to the back plate in a second position to enable removal of the adapter ring.

14. The soft box of claim 13, further comprising a plurality of tabs, wherein the tabs are attached to the fabric, wherein each of the tabs wraps around a respective locking knob to keep the fabric shell in place around the back plate.

15. The soft box of claim 9, further comprising a runner and a plurality of stretcher rods, wherein the frame comprises ribs, wherein each of the stretcher rods includes a first end and a second end, wherein the first end is connected to one of the ribs, wherein the second end is connected to the runner, wherein the support spindle extends through the runner.

16. A soft box comprising:
 a collapsible frame, wherein the collapsible frame supports a fabric shell;
 a back plate;
 a support spindle;
 a plurality of support rods extending from the back plate, wherein the plurality of support rods are circumferentially spaced about the back plate, wherein the support rods are operatively attached to the support spindle; and a mount, wherein the mount is attached to the back plate, wherein the mount is configured to attach to a light fixture that does not use an adapter ring to attach the light fixture to the soft box.

17. The soft box of claim 16, wherein the mount comprises a channel plate, wherein the channel plate is configure to attach to the light fixture.

18. The soft box of claim 16, wherein the mount comprises a first plate and a second plate, wherein the first plate is attached to the back plate, wherein the second plate is attached to the first plate, wherein the back plate may be selectively attached to different locations along the first plate, wherein each of the locations corresponds to a different height of the second plate.

19. The soft box of claim 18 wherein the second plate is configured to attach onto a light stand.

20. The soft box of claim 18, wherein the mount comprise a channel plate, wherein the channel plate is removably attached to the second plate, wherein the channel plate is configure to attach to the light fixture.

* * * * *